(12) United States Patent
Ayers et al.

(10) Patent No.: US 11,395,954 B2
(45) Date of Patent: Jul. 26, 2022

(54) METHODS AND APPARATUS FOR EMULATING LIVE PERFORMANCE ROUTINE COMPETITION CONDITIONS WITHOUT LIVE COMPETITION STAGING

(71) Applicant: Cheer Match Media, LLC, Thornton, CO (US)

(72) Inventors: Jayson Ayers, Thornton, CO (US); Wendy Ayers, Thornton, CO (US); Robert Paul Rowzee, Thornton, CO (US)

(73) Assignee: Cheer Match Media, LLC, Thornton, CO (US)

( * ) Notice: Subject to any disclaimer, the term of this patent is extended or adjusted under 35 U.S.C. 154(b) by 0 days.

(21) Appl. No.: 17/315,104

(22) Filed: May 7, 2021

(65) Prior Publication Data
US 2021/0346779 A1    Nov. 11, 2021

Related U.S. Application Data

(60) Provisional application No. 63/022,265, filed on May 8, 2020.

(51) Int. Cl.
*A63B 71/06* (2006.01)
*H04N 21/2187* (2011.01)
(Continued)

(52) U.S. Cl.
CPC ........... *A63B 71/0605* (2013.01); *H04N 5/91* (2013.01); *H04N 21/2187* (2013.01); *H04N 21/231* (2013.01); *H04N 21/47* (2013.01)

(58) Field of Classification Search
CPC ....... B32B 37/10; B32B 3/04; B32B 2457/20; B32B 37/0046; B32B 37/12
See application file for complete search history.

(56) References Cited

U.S. PATENT DOCUMENTS

| 6,606,104 B1 | 8/2003 | Kondo et al. |
| 6,824,462 B2 | 11/2004 | Lydon et al. |
| 8,649,889 B2 | 2/2014 | Cacciolo, Jr. |

(Continued)

FOREIGN PATENT DOCUMENTS

| EP | 1052000 A3 | 11/2000 |
| EP | 1052000 A2 | 12/2002 |

(Continued)

OTHER PUBLICATIONS

U.S. Appl. No. 63/022,265, filed May 8, 2020. First Named Inventor: Ayers.

*Primary Examiner* — Alazar Tilahun
(74) *Attorney, Agent, or Firm* — Santangelo Law Offices, P.C.

(57) ABSTRACT

Methods and apparatus for staging emulated live performance routine competitions. Various emulation methods and apparatus may allow for live conditions to be emulated even in the absence of actual staged live competition. Live performance routines may be recorded and stored as live performance routine data. Competition judging may be input and stored as competition judging input data. Data transformation processors may transform such data into live performance routine competition conditions emulated data that may emulate live performance routine competition conditions. Data may be aggregated into an emulated live performance routine competition for remote spectator access.

20 Claims, 20 Drawing Sheets

(51) Int. Cl.
    *H04N 21/231*     (2011.01)
    *H04N 21/47*     (2011.01)
    *H04N 5/91*     (2006.01)

(56) References Cited

U.S. PATENT DOCUMENTS

| | | |
|---|---|---|
| 8,663,017 B1 | 3/2014 | Smyth |
| 8,704,904 B2 | 4/2014 | Boyle et al. |
| 9,253,376 B2 | 2/2016 | Boyle et al. |
| 9,707,474 B1 | 7/2017 | Cardinale et al. |
| 10,065,074 B1 | 9/2018 | Hoang et al. |
| 10,307,644 B2 | 6/2019 | Jones et al. |
| 2002/0115488 A1 | 8/2002 | Berry et al. |
| 2003/0027639 A1 | 2/2003 | Peterson et al. |
| 2007/0191101 A1 | 8/2007 | Coliz et al. |
| 2008/0281443 A1 | 11/2008 | Rodgers |
| 2009/0118100 A1 | 5/2009 | Oliver et al. |
| 2009/0318267 A1 | 12/2009 | Park et al. |
| 2010/0004055 A1 | 1/2010 | Gormley et al. |
| 2010/0279827 A1 | 11/2010 | Farnsworth et al. |
| 2011/0207581 A1 | 8/2011 | Flaction |
| 2012/0183940 A1 | 7/2012 | Aragones et al. |
| 2012/0185484 A1 | 7/2012 | Jones et al. |
| 2012/0196268 A1 | 8/2012 | Cacciolo, Jr. |
| 2012/0277891 A1 | 11/2012 | Aragones et al. |
| 2013/0143669 A1 | 6/2013 | Muller |
| 2013/0162852 A1 | 6/2013 | Boyle et al. |
| 2013/0203480 A1 | 8/2013 | Deyoung |
| 2013/0338802 A1 | 12/2013 | Winsper et al. |
| 2014/0074265 A1 | 3/2014 | Arginsky et al. |
| 2014/0204230 A1 | 7/2014 | Boyle et al. |
| 2015/0057128 A1 | 2/2015 | Ishii |
| 2015/0126333 A1 | 5/2015 | Jones et al. |
| 2015/0127127 A1 | 5/2015 | Carpenter et al. |
| 2016/0023043 A1 | 1/2016 | Grundy |
| 2017/0038771 A1 | 2/2017 | Green et al. |
| 2017/0050081 A1 | 2/2017 | Jones et al. |
| 2017/0155608 A1 | 6/2017 | Garen |
| 2017/0173391 A1 | 6/2017 | Wiebe et al. |
| 2017/0274249 A1 | 9/2017 | Moebius et al. |
| 2017/0368413 A1 | 12/2017 | Shavit |

FOREIGN PATENT DOCUMENTS

| | | |
|---|---|---|
| WO | 2013096953 A1 | 6/2013 |
| WO | 2013115855 A1 | 8/2013 |
| WO | 2015069533 A1 | 5/2015 |

| Sub No. | Team | Level | Competition | Judge | Categories | Status | Action |
|---|---|---|---|---|---|---|---|
| #1 | Firefly Cheermatch.live | 3 Senior Coed 15-18 years old Boys: 2 | Girls: 20 | Beast of the East Match | Robert Rowzee | B1, T1, OV, SD | COMPLETED | Score |
| #1 | Firefly Cheermatch.live | 3 Senior Coed 15-18 years old Boys: 2 | Girls: 20 | Beast of the East Match | Robert Rowzee | B2, T2 | COMPLETED | Score |
| #2 | Blair Cheermatch.live | 4 International Junior 10-16 years old Boys: 2 | Girls: 20 | Beast of the East Match | Robert Rowzee | B1, T1, OV, SD | COMPLETED | Score |
| #2 | Blair Cheermatch.live | 4 International Junior 10-16 years old Boys: 2 | Girls: 20 | Beast of the East Match | Robert Rowzee | B2, T2 | COMPLETED | Score |
| #3 | Prod Test Cheermatch.live | 3 Youth 5-11 years old Boys: 2 | Girls: 20 | Beast of the East Match | Alison Dytko | OV, SD, B1, T1 | COMPLETED | Score |
| #3 | Prod Test Cheermatch.live | 3 Youth 5-11 years old Boys: 2 | Girls: 20 | Beast of the East Match | Alison Dytko | B2, T2 | COMPLETED | Score |
| #4 | M1 - Not Listed - | 6 International Open Coed - Non-Tumbling 14 years & Older Boys: 5 | Girls: 5 | Beast of the East Match | Josh Rowzee | B1, T1, OV, SD | COMPLETED | Score |
| #4 | M1 - Not Listed - | 6 International Open Coed - Non-Tumbling 14 years & Older Boys: 5 | Girls: 5 | Beast of the East Match | Josh Rowzee | B2, T2 | COMPLETED | Score |
| #5 | Rock - Not Listed - | 7 International Open - Non-Tumbling 14 years & Older Boys: 7 | Girls: 6 | Beast of the East Match | Jake Rowzee | B1, T1, OV, SD | COMPLETED | Score |
| #5 | Rock - Not Listed - | 7 International Open - Non-Tumbling 14 years & Older Boys: 7 | Girls: 6 | Beast of the East Match | Jake Rowzee | B2, T2 | COMPLETED | Score |
| Sub No. | Team | Level | Competition | Judge | Categories | Status | Action |

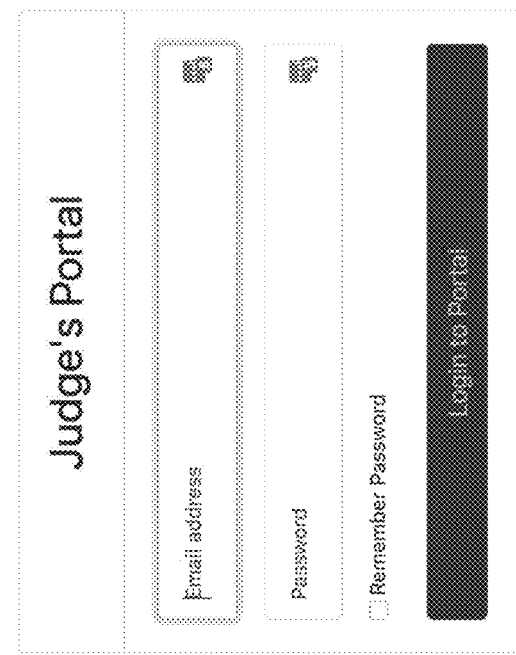
Fig. 5H

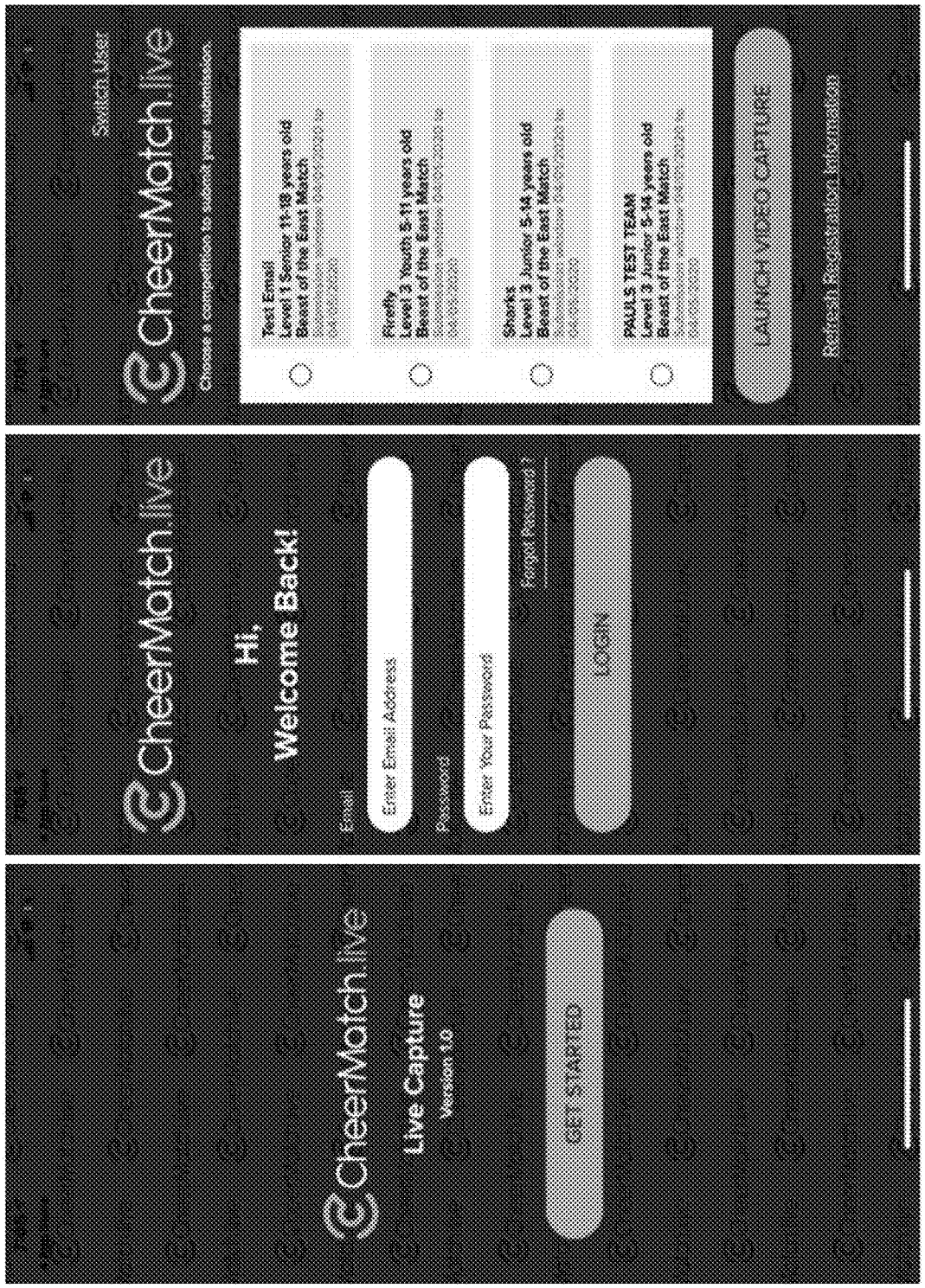

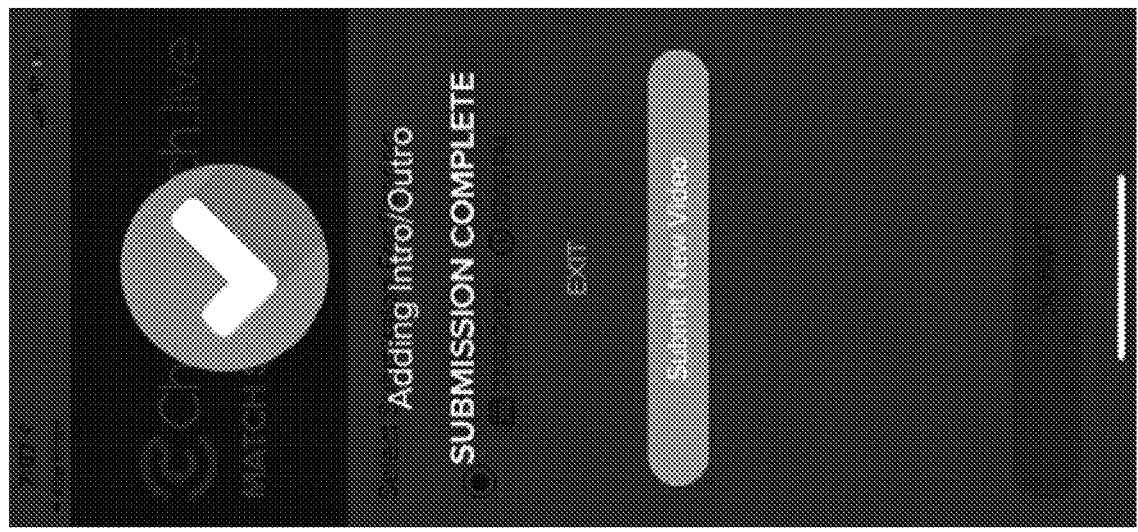
Fig. 5P
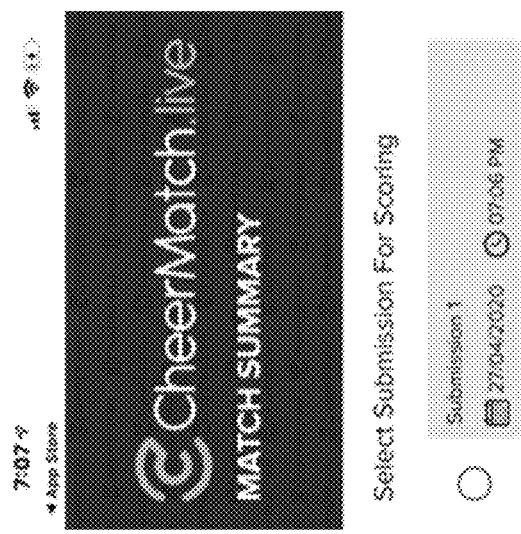
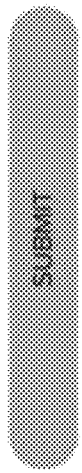
Fig. 5O

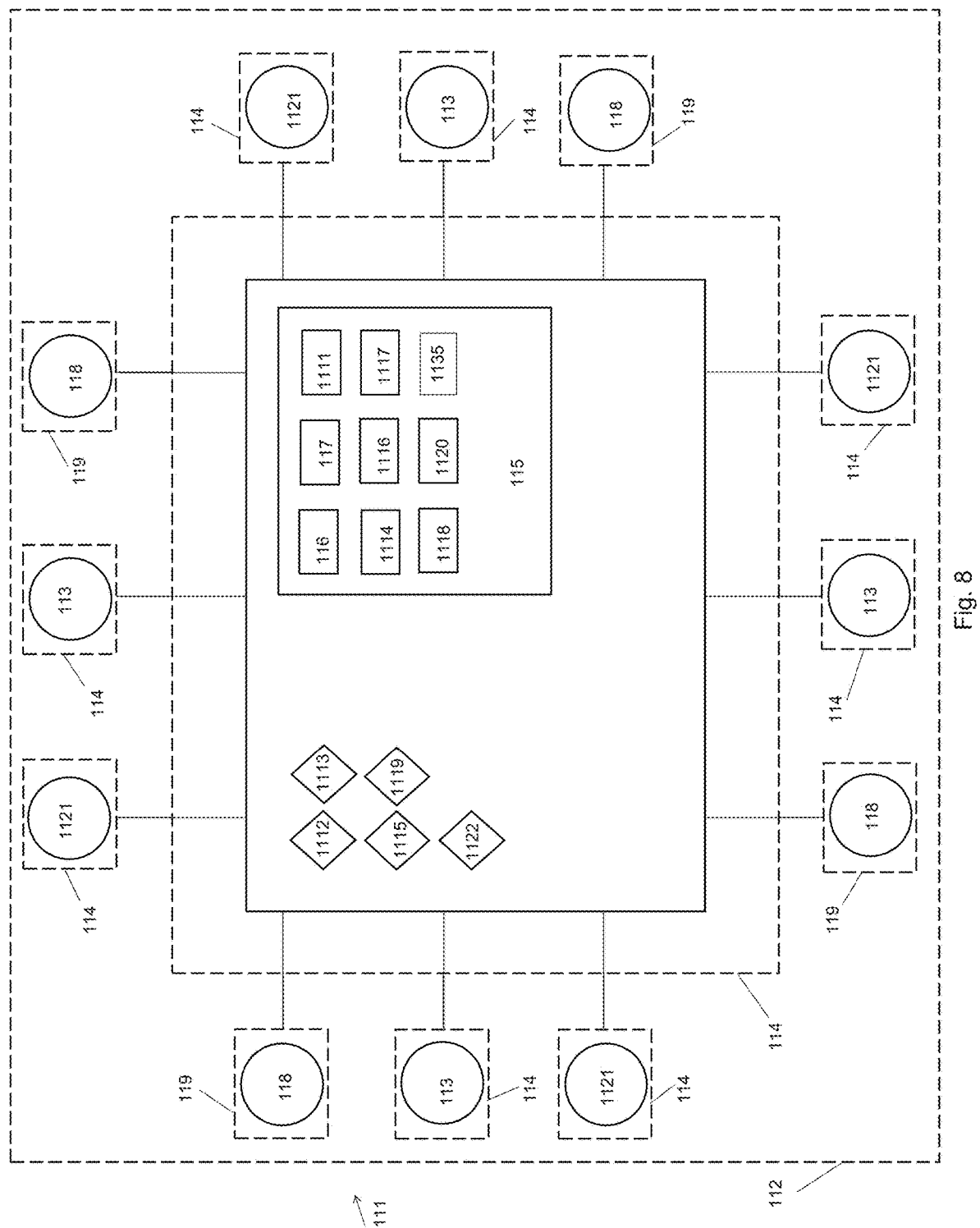

METHODS AND APPARATUS FOR EMULATING LIVE PERFORMANCE ROUTINE COMPETITION CONDITIONS WITHOUT LIVE COMPETITION STAGING

This application claims the benefit of and priority to U.S. Provisional Application No. 63/022,265, filed May 8, 2020, such patent application and any priority case hereby incorporated herein by reference in its entirety.

BACKGROUND

The present inventive technology relates to the field of emulating live performance routine competitions in an automated fashion without the actual live staging of such competitions. It may involve preserving live competition conditions in the emulated competition that otherwise typically only may be capable of being experienced in actual live competition, and may be particularly suited for upholding the ability to have performance routine competitions even where circumstances prevent them from actual live staging. In various embodiments, the present inventive technology may relate to fields of virtual competition, remote competition, and judging of events at a distance without a need to be in the same physical location. It may be applied to sports, performances, competitions, individuals, and groups, and other events that are typically thought of as requiring temporally or locationally proximate actions by individuals or teams. In particular it can include methods of using a mobile phone application to capture video content of a performance by a person or team not physically present at the competition to be uploaded directly to an online platform for a judge not physically present at the performance to score as part of a competition. Even more specifically, the present inventive technology may be configured to enforce rules during the video capture process and during the judging process that can be similar to and can mimic those procedures which take place when athletes or performers are physically present in the same place with the competition judges.

Among the many social activities disrupted by the well-known Covid-19 pandemic may be live performance routine competitions, such as cheerleading competitions, dance competitions, gymnastics competitions, musical performance competitions, and other performance- or judge-based sports and the like. These competitions typically may involve competitors engaging in different types of performance routines—again, cheerleading routines, dance routines, gymnastics routines, musical performances, and other performance- or judge-based sports or the like—that may be scored or otherwise evaluated by one or more judges. Such competitions also typically may involve gathering the competitors, judges, and spectators together at a single site or location for the staging of the competition.

Competition is typically thought of as a side-by-side or one-after-another event where either performers practice their craft in series or parallel before a set group of judges or evaluator(s) to assess compliance and determine a winner. Competitors can compete side-by-side, in parallel, or one-after-another, in series. As but one example, with very few exceptions all sports and performing arts that are competition-based usually take place with the judges in the same room or arena as the competitors. For each competition there are typically rules and procedures to be followed by the judges and the competitors. These rules can inform the competitors in advance how their performance will be compared to other competitors and the judges to ensure a fair scoring process. Enforcement of these rules can also ensure the integrity of the competition and are usually easy to manage when all competitors and judges are in the same physical location. These rules can be very difficult to enforce when all parties involved are not in the same physical location.

Because of social distancing measures put in place due to the Covid-19 pandemic, the on-site gathering of competitors, judges, and spectators may have become impractical or impossible. This has also made more widespread the use of remote meetings and even remote and virtual group activities. While various technologies may have been attempted to hold such competitions virtually, these attempts may have failed to preserve aspects of live competition that follow directly from the gathering together of the competitors, judges, and spectators at a site or location. For example, simply recording a performance routine and remotely submitting it for judging may fail to replicate the time constraints, site conditions, technical limitations, personal interactions, and other aspects of actual live competition that can affect or even be outcome-determinative of such live competition.

The present inventive technology is created to address aspects and facilitate remote and even virtual competition such as may be desirable for teams and competitors and even judges at a distance or performing at different times. It can be particularly helpful in situations where the expense or inconvenience make co-located or co-temporal performance impractical or can even prohibit participation to the detriment of the competition or the competitors. This can be particularly applicable for younger or larger participations. The present inventive technology addresses problems and difficulties to make this a reality across a wide spectrum of activities.

While the prior art may disclose methods and apparatus for holding various kinds of competitions online, these prior art methods and apparatus fail to take into account that such online competition inherently lacks conditions stemming from the live element of live competition, and therefore must be accounted for if live competition conditions are to be replicated, simulated, or approximated in the online environment. For example, U.S. Pat. No. 8,663,017 to Smyth may describe a matrix judging system utilizing a computer-readable medium(s). However, the matrix judging system may be described as for radio programs, television programs, feature films, advertising campaigns, etc. Because these kinds of programs, films, and campaigns may not be in the nature of live competition, Smyth fails to disclose methods or apparatus that replicate, simulate, or approximate live competition. Similarly, U.S. Pat. No. 10,307,644 to Jones, et al., may disclose a virtual competition environment broadly applicable to competitions including road races, dance competitions, weight lifting competitions, workout competitions, crafting competitions, skateboarding competitions, fashion competitions, and/or a wide variety of other activities in which users may compete. However, Jones' virtual competition environment targeted to a variety of kinds of competition again fails to account for the need to replicate, simulate, or approximate live competition conditions as may arise specifically for the kinds of live performance routine competitions (e.g., cheerleading routines, dance routines, gymnastics routines, musical performances, and other performance- or judge-based sports) for which the present inventive technology is particularly applicable.

It may be appreciated that the inventive technology described herein, including but not limited to embodiments pertaining to live performance routine competition conditions emulated data (117) and emulated live performance routine competitions (1120), may be impractical or impossible to achieve via human intervention alone. In particular, the description herein in various embodiments may describe a specific machine that emulates live performance routine competition conditions in the absence of actual live competition. This may confer the practical application of being able to preserve live performance routine competition conditions when circumstances otherwise might prevent the staging of live performance routine competitions. The various embodiments of the inventive technology do not involve only human activity, human intelligence, interactions between people, mental processes and the like, but rather necessarily must be implemented by the various apparatus disclosed herein, e.g., by representing live competition conditions as data as described for various embodiments. This may also show that the inventive technology as described and claimed is "something more" than, e.g., only human activity, human intelligence, interactions between people, mental processes and the like. Descriptions of hardware herein may be seen not to be simply generic, but rather may describe hardware having specific, practical attributes, e.g., representing live competition conditions as data for disclosed hardware in order to emulate live competition conditions without actually staging live competition. While the inventive technology may be relevant to and may involve organizing human activity and interactions between people, e.g. as may relate generally to the staging of live performance routine competitions, the disclosed apparatuses and related systems, processes, and techniques disclose "something more" than human activity, e.g. by representing live competition conditions as data as described for various embodiments, which may be capable only of implementation by machines, computers, or other apparatuses. Such implementation by machines, computers, or other apparatuses—which may be necessary to implement the inventive technology and without which the inventive technology may not be able to be achieved—may be seen as integrating any abstract ideas that otherwise may be present in the inventive technology into a practical application. The embodiments described herein relating to, e.g., transforming data and representing live competition conditions as data may be seen as illustrative of how the inventive technology accomplishes results that are not done, and even are not capable of being done, manually. It may also be seen that the described inventive technology does not preempt any abstract idea, mental process, or the like, in as much as the described inventive technology is implemented on the specific machines, computing devices, or other apparatuses described herein and which implement practical applications of the inventive principles, e.g., representing live competition conditions as data for the practical application of avoiding actual live competition. Moreover, it may be seen that the described inventive technology has a physical form as manifested, for example, in recording means such as video cameras, computing devices such as smartphones, spectator portals such as websites, etc.

The foregoing problems related to conventional virtual competitions may represent a long-felt need for an effective solution to the same. While some of the implementing elements may have been available, actual attempts to meet this need may have been lacking to some degree. This may have been due to a failure of those having ordinary skill in the art to fully appreciate or understand the nature of the problems and challenges involved. As a result of this potential lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

SUMMARY OF THE INVENTIVE TECHNOLOGY

In one embodiment, an object of the inventive technology may be to provide an apparatus for the emulation of live performance routine competition conditions comprising a live performance routine competition emulation networked environment, a first recording means capable of access to and being accessed through a networked environment and configured to record a first live performance routine occurring at a first remote location, a first allocated memory capable of access to and being accessed through a networked environment and configured to automatically store a recorded first live performance routine as first live performance routine data, a second recording means capable of access to and being accessed through a networked environment and configured to record a second live performance routine occurring at a second remote location, a second allocated memory capable of access to and being accessed through a networked environment and configured to automatically store a recorded second live performance routine as second live performance routine data, at least one input/output means capable of access to and being accessed through a networked environment and configured to automatically output live performance routine data to a remote judging location and to automatically accept competition judging input from a remote judging location, a third allocated memory capable of access to and being accessed through a networked environment and configured to automatically store competition judging input as competition judging input data, and a data transformation processor capable of access to and being accessed through a networked environment and configured to automatically transform any or any combination of live performance routine data and competition judging data into live performance routine competition conditions emulated data. Another object of the inventive technology may be to implement the inventive technology as a live cheerleading competition conditions emulation apparatus. The present inventive technology can include, among other embodiments, an embodiment for a closely connected process that may be considered as having three main components.

One component may include: a mobile phone application or other functionality that can capture a performance by video (1), perhaps with any of the following:
An app that can pull GPS location (21), which may help to validate where the performance took place;
An app that can automatically timestamp a video (22), which may help to validate the performance was captured during the allotted time of the competition;
Settable rules (23) for the capture of a performance that can be adapted for various sports and performing arts competitions and that can even be automatically enforced to some degree by the app;
A registration element (24) in the app that can validate all competitors meet the requirements for the competition; and even Other competitor-centric features (25) readily available for inclusion as desired or to allow user adaptation as appropriate to a particular event, performance, or sport.

A second component may include: an online portal for judges (2), whereby they could score a performance, perhaps with any of the following:

A judge's portal that can automatically verify the judges are trained and certified on the platform (26) and that can authenticate it is in fact that specific judge doing the scoring;

A judge's portal that can automatically enforce that scoring takes place only during the allotted time of the competition (27);

A judge's portal that can only allow the judges to review performances a set number of times as laid out in the rules of the competition (28);

A judge's portal that can automatically send the final scores to a judge's coordinator to certify they are accurate and fair according to the rules of the competition (29); and Other judging-centric features (30) readily available for inclusion as desired or to allow user adaptation for judging as appropriate to a particular event, performance, or sport.

A third component may be: an online viewing portal for competitors, judges, and others to view a compiled video of the competition (3), perhaps with any of the following:

Once all performances are scored and verified by the judge's coordinator, they may be compiled into a single video to stream over the internet for fans, judges (31), and competitors to watch at a preset time together whether in parallel or in series. This can even be configured to automatically give live event visuals and feel to a set of pre-recorded performances;

Fans, judges, and competitors can also have access to watch competitions on demand (32) whenever and wherever they would like; and Other spectator or viewer-centric features (33) readily available for inclusion as desired or to allow user adaptation for viewing as appropriate to a particular event, performance, or sport.

Other advantages of the present inventive technology can include:

Eliminates the need to travel to large venues to participate

Dramatically reduces the cost commonly associated with competition

Compete against anyone or any team throughout the world

Live broadcast of competition can be viewed on social media or via live stream

Share events with friends and family

Increased competition frequency and improve readiness

Naturally, further objects of the inventive technology will become apparent from the description and drawings below.

BRIEF DESCRIPTION OF THE DRAWINGS

FIG. 8 shows a block diagram of a live performance routine competition conditions emulation apparatus in one exemplary embodiment of the present inventive technology.

DETAILED DESCRIPTION OF THE PREFERRED EMBODIMENTS

It should be understood that embodiments include a variety of aspects, which may be combined in different ways. The following descriptions are provided to list elements and describe some of the embodiments of the application. These elements are listed with initial embodiments; however, it should be understood that they may be combined in any manner and in any number to create additional embodiments. The variously described examples and preferred embodiments should not be construed to limit the embodiments of the application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 7:
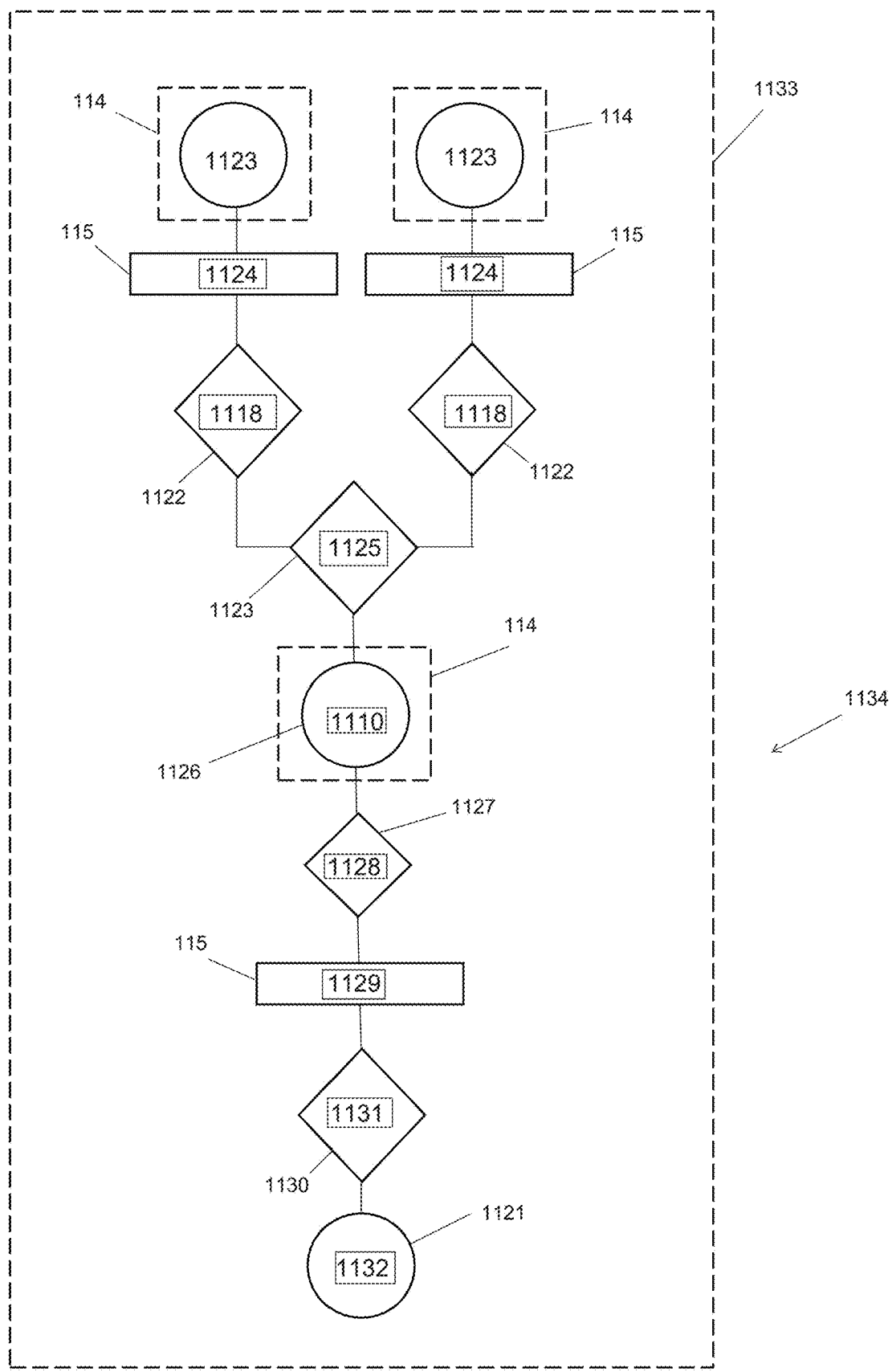
FIG. 7 shows a block diagram of a live cheerleading competition conditions emulation apparatus in one exemplary embodiment of the present inventive technology.

With reference primarily to FIGS. 7 and 8, in various embodiments, the inventive technology may involve a live performance routine competition conditions emulation apparatus (111). Some embodiments of the inventive technology may involve a live cheerleading competition conditions emulation apparatus (1134).

Performance routines may involve pre-planned or worked-out acts, performances, or routines by individuals or groups intended to be viewed by an audience as a cohesive presentation, for example in the nature of cheerleading routines, dance routines, gymnastics routines, musical performances, and other performance- or judge-based sports and the like. A performance routine competition may involve two or more performance routines that are judged, scored, or otherwise evaluated in order to determine their merits with respect to one another, such as by declaring a winner, declaring rankings, and the like.

The inventive technology in various embodiments may involve emulating a live performance routine competition. For reference and to aid in such understanding, certain attributes of actual live performance routine competitions are described. Performance routine competitions may be held live. A live performance routine competition generally may involve some or all of the performers, the judges, the spectators, and other participants or attendees of the competition being present at the same site or location, for example in the nature of a cheerleading match, a dance recital, a gymnastics meet, or a musical concert.

The inventive technology in various embodiments may involve emulating live performance routine competition conditions. For reference and to aid in such understanding, certain attributes of actual live performance routine competition conditions are described. Live performance routine competitions may have live performance routine competition conditions. These generally may be conditions that follow from and would tend not to be present but for the live nature of the competition. Examples of live performance routine competition conditions may include:

That judges may see each performance only once;

That judges may see each performance only from the angle and perspective from which they are observing, and may see all performances from such angle and perspective;

That judges may see each performance as performed in real time;

That judges may see some or all performances in the same performance space or setting;

That judges may see some or all performances subject to the same site-specific environmental conditions and/or technical limitations, such as crowd noise, space limitations, lighting limitations, music or soundtrack limitations, and the like;

That judges may see some or all performances within delimited schedules or blocks of time;

That judges may see some or all performances in specific sequences or orders;

That performers may only have one attempt or a limited number of attempts at their performance;

That individual performers and/or performances may be required to perform or be performed in the same physical performance space as other performers and/or performances;

That performers and/or performances may be subject to environmental conditions, technical limitations, or other site-specific or competition-specific attributes, such as crowd noise, space limitations, lighting limitations, music or soundtrack limitations, and the like;

That performers and/or performances may take place in scheduled or delimited blocks of time and/or may be subject to time limits;

That performers and/or performances may be subject to order or sequence limits;

That performers and/or performances may be limited in performance aspects such as dress, props, signage, sets, and the like;

That performers and/or performances may be required to comply with performance rules, required elements, and the like.

However, the foregoing examples should be understood to be illustrative only, and should not be construed to limit the full scope of factors, things, or attributes that would constitute live performance routine competition conditions as defined or otherwise consistent with the inventive principles discussed herein, and/or which would be capable of emulation as otherwise described herein.

Now with reference to embodiments involving emulating live performance routine competition conditions, in some embodiments, live performance routine competition conditions may be emulated. While both general and specific techniques, manners, and modalities for such emulation may be described elsewhere herein, the emulation of live performance routine competition conditions generally may involve subjecting a performance routine competition participant(s) (such as a performer, judge, team, or spectator) to or otherwise creating a condition that replicates, simulates, or approximates a live performance routine competition condition, but is not imposed or created at or in an actual live performance routine competition.

Figure 1:
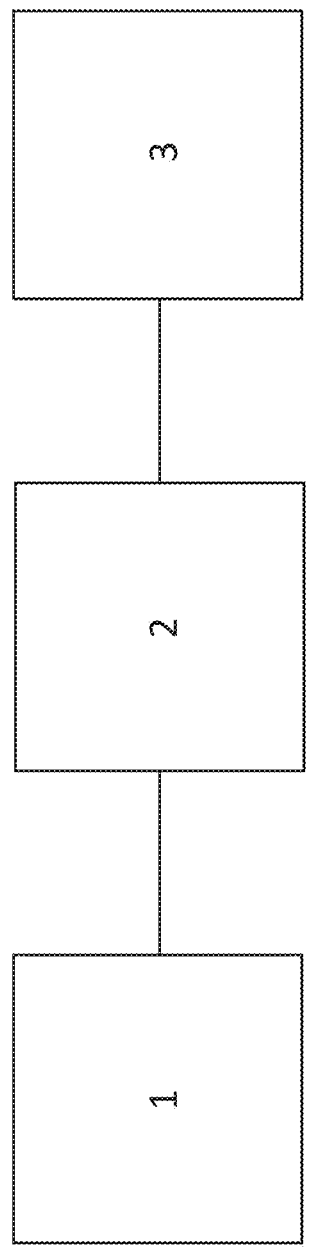
FIG. 1 shows a generic representative flow chart of a closely connected process in accordance with one exemplary embodiment of the present inventive technology.

As shown with reference to FIG. 1, the inventive technology in some embodiments can be considered as involving three main components. If desired to be included, these may include: a mobile phone application that can capture a performance by video (1), this may be linked to an online portal for judges to score a performance (2), which may then be linked to an online viewing portal for competitors, judges, and others to view a compiled video of the competition (3).

Figure 2:
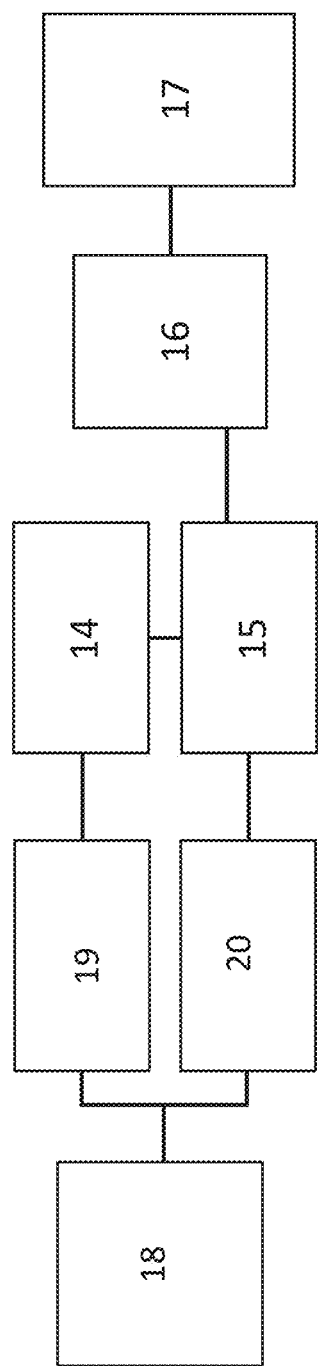
FIG. 2 shows a more detailed representative flow chart of an additional closely connected process in accordance with one exemplary embodiment of the present inventive technology.

As shown with reference to FIG. 2, the present inventive technology in some embodiments can include as a part of the mobile phone application (1) a rules definition element (18). If desired to be included, this rules definition element (18) can enable rules to be created by for example, administrators or judges, and can be viewable by any, or only certain, users including judges, competitors, coaches, or the like. Communicative to the rules definition element (18) may be a competitor installation and use configuration element (19), and/or a judge's installation and use configuration element (20). If desired to be included, the competitor installation and use configuration element (19) may be linked with a performance capture element (14). This element could enable competitors to upload a video of their performance to the application, to possibly then be viewed by judges or other spectators. The judge's installation and use configuration element (20), if desired to be included, may be linked to a judge upload for competition element (15), whereby a judge or judges can install appropriate functionality to be able to judge a competition as well as to administer details for the judge(s) or the like. Linked to the judge upload for competition element (15) might be a competition activity element (16) whereby the competition "occurs" and is judged. A spectator/viewing installation and use configuration element (17) may be desired to be included. This may then be linked to the competition activity element (16) and allow for users to view competitions. The spectator/viewing installation and use configuration element (17) may also provide spectators the ability to interact during competitions by publicly commenting during the competition perhaps by allowing icons to mimic as spectators cheer, clap, boo, or the like. If desired, in certain embodiments, commenters could interact with each other's comments during a viewing of a competition. They could pick sides, support a team, country, or competition, or the like.

Figure 3:
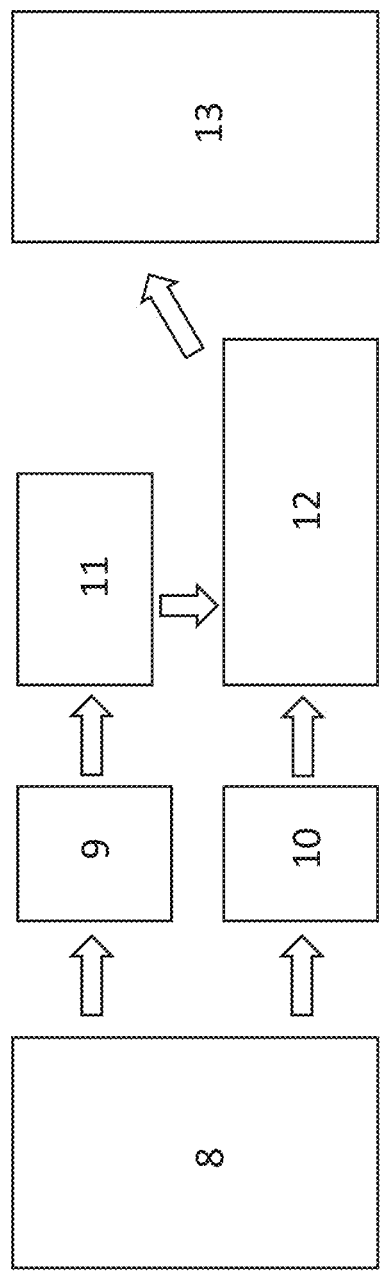
FIG. 3 shows a process sequence representative flow chart of yet another closely connected process in accordance with one exemplary embodiment of the present inventive technology.

As shown with reference to FIG. 3 included in the present inventive technology if desired in some embodiments may be an element that can provide rules for the competition to be set and/or defined for the competitors and the rules for scoring and judging to be defined for the judges (8). If desired to be included, this feature could include rules that could be capable of being rigid, or could be capable of permitting those with certain access (i.e. administrators, directors, etc.) to edit and revise said rules. Perhaps once the rules are set, they may then be viewed by competitors and/or other spectators. Competitors and/or other spectators may install the mobile phone application (9) and may have a specific login username and password and may be associated with their team, their geographic location, their skill-level, their age, or any other number of identifying factors. If desired, a "spectator" account could look and function differently than a "competitor" account. As shown, judges may also have their own account and they may be trained and certified via a judges' portal (10). In some embodiments, a video performance could be captured (11), and then uploaded (12) directly to the judges' portal. A video containing final competitions, complete with judges' scores could be compiled and streamed for competitors, judges, and other spectators to view (31).

Figure 4:
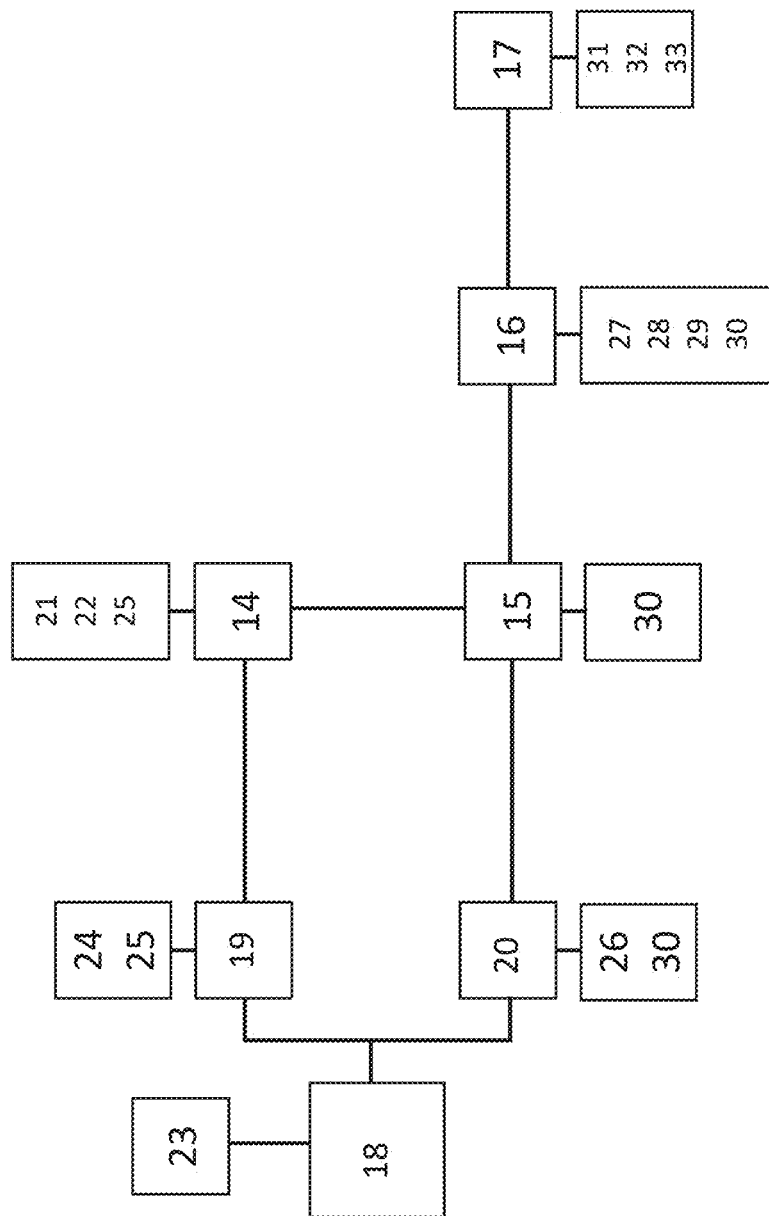
FIG. 4 shows an even more detailed representative flow chart of an alternative closely connected process in accordance with one exemplary embodiment of the present inventive technology.

In embodiments, such as shown with reference to FIG. 4, rules could be imported or set (23) into the rules definition element (18). If desired to be included, in some embodiments, the rules definition element may be viewable by spectators, judges, coaches, and or competitors. It may also be linked to a competitor installation and use configuration element (19), which may be responsive to a video performance that has been captured (11) perhaps by the app's performance capture element (14) and uploaded (12) by a user, for example, a coach or competitor. The rules definition element (8) if desired may also function in conjunction with the judges' installation and use configuration element (20). This may vary from the competitor installation and use configuration element (19) in that judges may be able to access certain videos and pages that competitors can't. If desired, the judges' installation and use configuration element (20) may enable access to certain features such as "pause", "slow-mo", etc. in order to better be able to judge the competition or performance. Such can even be sync'd or required for multiple or even all judges 'simultaneously'—at least in that judge's viewing sequence or time. The judges' installation and use configuration element (20) may be responsive to or otherwise work in conjunction with a judges' portal (26), which could be configured to, among other things, verify that judges are properly vetted, trained, and certified. The performance capture element (14), which may function as part of the competitor installation and use element (19) may include the ability to: pull GPS location (21) to identify where the performance took place; a time stamp feature (22) to automatically identify and stamp the exact time the performance took place, possibly to ensure it met time requirements; validate all competitors meet requirements for a competition (24); and a variety of other competitor-centric features (25) readily available for inclusion to further ensure compliance with the set rules (23) or perhaps purely for informational purposes. A feature allowing judges to upload data, comments, scores, or video(s) (15) may be available via the judge's installation and use configuration element (20). Other judging-centric features (30) may be readily available for inclusion as desired or to allow user adaptation for judging as appropriate to a particular event, performance, or sport. A competition activity element (16) can conduct the competition by sequencing or presenting as appropriate. Embodiments may also include the capability to contain: a judges portal that may automatically enforce that scoring takes place only during the allotted time of the competition (27); a judge's portal that can allow the judge to review performances a set number of times as laid out (28); a judges portal that can automatically send the final scores to a judges coordinator to certify they are accurate and fair according to the rules of the competition (29); and any other desired judging-centric features (30). Of course, if desired, this can be customized from competition to competition, or from performance to performance. A viewer/spectator installation and use configuration element (17) may be included as a feature of the present inventive technology. This element (17) could have certain restricted access whereby spectators could view a performance or performances after it has been scored and verified by the judge's coordinator. The final performance video could be compiled into a single video to stream over the internet (31). The stream-able video could be capable of being viewed on demand (32) by for example, fans, judges, competitors, or anyone else who may so desire. Or, in certain cases, a video of a performance could also be live-streamed whereby spectators/viewers, using the spectator/viewing installation and use configuration element (17) can watch a performance in real time along with judges using the judge's installation and use configuration element (20). The viewer/spectator installation and use configuration element (17) may also contain other spectator or viewer-centric features (33) readily available for inclusion as desired or to allow user adaptation for viewing as appropriate to a particular event, performance, or sport.

Now with reference to FIGS. 7 and 8, various embodiments may involve the use of a live performance routine competition emulation networked environment (112). A networked environment (112) generally may utilize two or more perhaps automated and computer programmed devices that can communicate with one another, and in various examples may be as small as two devices, as large as millions or more of devices, may utilize any devices suitable for networking such as desktop computers, laptop computers, tablet computers, smartphones, smart televisions, gaming consoles, smart appliances, and the like, and may include any suitable kind of network, such as local area networks, wide area networks, and the like. In some embodiments, a networked environment (112) may be the Internet and/or the World Wide Web. The networked environment (112) in various embodiments may be a practically-applied apparatus on which aspects for the emulation of a live performance routine competition may be implemented, and the description herein of various components of the networked environment (112) may be seen as practically applying the emulation of a live performance routine competition that may preserve live performance routine competition conditions. In some embodiments, a networked environment (112) may be a live cheerleading competition emulation networked environment (1133).

In various embodiments, various kinds of devices may be capable of access to and being accessed through a networked environment (112). Access generally may involve the ability to gain access to and utilize the facilities and resources of the networked environment (112), for example by adding data to devices in the networked environment (112), retrieving data from devices in the networked environment (112), transforming data in the networked environment (112), communicating with devices in the networked environment (112), and generally enjoying the benefits and capabilities of networked computing.

In various embodiments, various items, devices, and things may be described as being automated, and various actions, capabilities, and functionalities may be described as being implemented or executed automatically. The terms automated and automatically may be understood to include a capability to engage in substantially self-directed action, perhaps self-directed action as may be possible without or with limited human intervention, and perhaps as may be indicated by machine-implemented action, computer-implemented action, computer programmed action, or the like.

The live performance routine competition conditions emulation apparatus (111) in various embodiments may have recording components, subroutines, or means (113) capable of access to and being accessed through a networked environment (112), and configured to record a live performance routine occurring at a remote location (114).

Recording components, subroutines, or means (113) may be generally known and understood for the technical field described herein, and for the inventive technology may include any device or process suitable for recording a live performance routine, and in various embodiments may include electronic recording devices, analog recording devices, digital recording devices, cameras, still cameras, video cameras, web cams, audio recording devices, microphones, voice recorders, motion sensors, light sensors, heat sensors, biometric sensors, portable recording devices, desktop computers, laptop computers, tablet computers, smartphones, recording hardware, recording software, and the like.

Remote locations (114) at which one or more live performance routines may be recorded naturally simply may be locations that are separated, apart, distant, or situated at some distance away from one another, and in various embodiments may include locations simply different than or removed from a conventional site or location at which a live performance routine competition otherwise might be staged.

The apparatus described herein naturally may have a plurality of recording subroutines, components, or means (113) for recording multiple live performance routines occurring at one or more dispersed remote locations (114). For example, embodiments may involve a first recording subroutine, component, or means (113) configured to record a first live performance routine occurring at a first remote location (114), a second recording subroutine, component, or means (113) configured to record a second live performance routine occurring at a second remote location (114), and so forth. Also naturally, the specific kind or recording subroutine, component, or means (113) need not be the same in each instance, any suitable recording subroutine, component, or means (113) consistent with the inventive principles discussed herein may suffice. Some embodiments may involve a first video camera (1123) capable of access to and being accessed through a networked environment (112) and configured to record a first live cheerleading routine occurring at a first remote location (114) and a second video camera (1123) capable of access to and being accessed through a networked environment (112) and configured to record a second live cheerleading routine occurring at a second remote location (114).

The live performance routine competition conditions emulation apparatus (111) in various embodiments may have allocated memory (115) capable of access to and being accessed through a networked environment (112), and configured to automatically store a recorded live performance routine as live performance routine data (116).

Memory (115) may be generally known and understood in the technical field described herein, and for the inventive technology may involve any memory (115) suitable for storing data on or in a networked environment (112) that may be utilized consistent with the inventive principles discussed herein, and in various embodiments may include random access memory, EDO RAM, SRAM, DRAM, DDR RAM, read only memory, PROM, EPROM, EEPROM, flash memory, NAND flash memory, hard disk drives, solid state drives, tape drives, optical drives, CD drives, DVD drives, floppy disks, memory chips, digital memory, analog memory, memory hardware, memory software, volatile memory, non-volatile memory, local storage, cloud storage, and the like.

Allocated memory (115) may involve simply the designation of all or part of a given memory (115) for the storage of live performance routine data (116), for example storing all or part of such data on the same memory device, on different memory devices, on a part or different parts of the same or different memory devices, and so forth.

Data may be generally known and understood for the technical field described herein, and for the inventive technology may be understood to involve any and all kinds of data generally known in the art suitable for use with the inventive principles discussed herein. The capabilities of the various kinds of apparatuses described herein to store recorded live performance routines as live performance routine data (116) may involve the live performance routines being embodied as information capable of processing or storage by a computer, which in some examples may be video clips, audio clips, images, text, software programs, and the like. The embodiment of recorded live performance routines as live performance routine data (116) may contribute to the practical applicability of the apparatus described herein, as such data may be capable of transformation by the apparatus into live performance routine competition conditions emulated data (117) having practical applications.

The apparatus described herein naturally may have a plurality of allocated memory (115) for automatically storing a plurality of recorded live performance routines as a plurality of live performance routine data (116). For example, embodiments may involve a first allocated memory (115) configured to automatically store a recorded first live performance routine as first live performance routine data (116), a second allocated memory (115) configured to automatically store a recorded second live performance routine as second live performance routine data (116), and so forth. Moreover, some embodiments may involve a first allocated memory (115) capable of access to and being accessed through a networked environment (112) and configured to automatically store a recorded first live cheerleading routine as first live cheerleading routine data (1124) and a second allocated memory (115) capable of access to and being accessed through a networked environment (112) and configured to automatically store a recorded second live cheerleading routine as second live cheerleading routine data (1124).

The live performance routine competition conditions emulation apparatus (111) in various embodiments may have input/output subroutines, components, or means (118) capable of access to and being accessed through a networked environment (112) and configured to automatically output live performance routine data (116) to a remote judging location (119) and to automatically accept competition judging input (1110) from a remote judging location (119).

Input/output subroutines, components, or means (118) may be generally known and understood for the technical field described herein, and for the inventive technology may include any software or hardware capable to send and/or receive data to and from the networked environment (112), and in various embodiments may include cameras, video cameras, still cameras, web cams, microphones, keyboards, keypads, touch pads, mouses, scanners, joysticks, track pads, track balls, game pads, pens, stylus, tablets, optical readers, magnetic readers, bar code readers, motion capture devices, biometric capture devices, MIDI controllers, video cards, sound cards, network cards, modems, screens, touch screens, displays, monitors, printers, speakers, headphones, headsets, projectors, GPS devices, plotters, and the like.

A judge may be a competition participant who judges, scores, or otherwise evaluates live performance routines in order to determine their merits with respect to one another, such as by declaring a winner, ranking the live performance routines based on one or more criteria, and the like. One or more remote judging locations (119) naturally simply may be locations at which judges are or at which judging occurs that are separated, apart, distant, or situated at some distance away from one another, and in various embodiments may include locations simply different than or removed from a conventional site or location at which a live performance routine competition otherwise might be staged.

Live performance routine data (116) that is automatically output to a judge simply may involve making a recorded live performance routine available to the judge for judging at the remote judging location (119) via the networked environment (112), for example, by outputting the data as video displayed on screen or the like. Similarly, competition judging input (1110) simply may be the judgment, score, calculated values, or other evaluation of a judge in the form of input provided to or through a suitable input/output device via the networked environment (112), such as text entry on a keyboard or the like.

Moreover, in various embodiments input/output subroutines, components, or means (118) may be a judging terminal (1126) capable of access to and being accessed through a networked environment (112) and configured to automatically display normalized capture limit compliant live cheerleading routine data (1125) to a remote judge and to automatically accept judging input (1110) from a remote judge, as such data may be described elsewhere herein.

The live performance routine competition conditions emulation apparatus (111) in various embodiments may have allocated memory (115) capable of access to and being accessed through a networked environment (112), and configured to automatically store competition judging input (1110) as competition judging input data (1111).

Memory (115) again may be generally known and understood the technical field described herein, and for the inventive technology may involve any memory (115) suitable for storing data on or in a networked environment (112) that may be utilized consistent with the inventive principles discussed herein, and in various embodiments may include random access memory, EDO RAM, SRAM, DRAM, DDR RAM, read only memory, PROM, EPROM, EEPROM, flash memory, NAND flash memory, hard disk drives, solid state drives, tape drives, optical drives, CD drives, DVD drives, floppy disks, memory chips, digital memory, analog memory, memory hardware, memory software, volatile memory, non-volatile memory, local storage, cloud storage, and the like. Allocated memory (115) may involve simply the designation of all or part of a given memory for the storage of competition judging input data (1111), for example storing all or part of such data on the same memory device, on different memory devices, on a part or different parts of the same or different memory devices, and so forth.

Data again may be generally known and understood for the technical field described herein, and for the inventive technology may be understood to involve any and all kinds of data generally known in the art suitable for use with the inventive principles discussed herein. The capabilities of the various kinds of apparatuses described herein to store competition judging input (1110) as competition judging input data (1111) may involve the competition judging input (1110) being embodied as information capable of processing or storage by a computer, which again in some examples may be video clips, audio clips, images, text, software programs, and the like. The embodiment of competition judging input (1110) as competition judging input data (1111) again may contribute to the practical applicability of the apparatuses described herein, as such data may be capable of transformation by the apparatuses into live performance routine competition conditions emulated data (117) having practical applications as described elsewhere herein.

The apparatus described herein naturally may have a plurality of allocated memory (115) for automatically storing a plurality of competition judging input (1110) as a plurality of competition judging input data (1111). For example, embodiments may involve a third allocated memory (115) configured to automatically store competition judging input (1110) as competition judging input data (1111), and so forth.

The live performance routine competition conditions emulation apparatus (111) in various embodiments may have a data transformation processor (1112) capable of access to and being accessed through a networked environment (112) and configured to automatically transform any or any combination of live performance routine data (116) and competition judging input data (1111) into live performance routine competition conditions emulated data (117).

Processors may be generally known and understood for the technical field described herein, and for the inventive technology may be understood to include hardware and/or software that receives data that is input and provides data that is output. A data transformation processor (1112) as described herein may receive various of the kinds of data described herein and change it in condition, nature, or character, for example by modifying it, adding to it, subtracting from it, and the like.

In some embodiments, such data may be live performance routine data (116), competition judging input data (1111), and/or any or any combination of such data, and transforming such data may involve transforming it into live performance routine competition conditions emulated data (117). Live performance routine competition conditions emulated data (117) generally may involve data that enables a live performance competition condition to be emulated in such a way that an actual live performance competition need not be staged, and examples of live performance routine competition conditions emulated data (117) may be further described herein. The capability to emulate live performance routine competition conditions without the staging of actual live performance routine competition may be understood to be a practical application of the apparatuses disclosed herein.

In some embodiments, a data transformation processor (1112) may be a live performance routine data transformation processor (1113) configured to automatically create output limit data (1114) for live performance routine data (116) output through an input/output means (118). Output limit data (1114) may be live performance routine data (116) that is transformed to limit its scope in a manner that may emulate or facilitate the emulation of a live performance routine competition condition. For example, as so transformed, the data may be output via the input/output means (118) to a judge, and the judge may experience or otherwise may be subjected to a live performance routine competition condition emulated by the transformed data.

Specific examples of output limit data (1114) in various embodiments may include:

number of views limit data, for example which may limit the number of times the output data may viewed. In some embodiments, for example, the output data may be video or the like of a recorded performance routine, and a judge may be limited in viewing the routine to the same number of times as the judge would be able to do so at a live performance routine competition, such as perhaps one time, or perhaps the number of times corresponding to a heat, and so forth. This feature naturally may be seen to illustrate the practical applicability of the apparatus to emulate a live performance routine competition condition. In some embodiments, number of views limit data may be number of displayed views limit data for an input/output means (118).

pause limit data, for example which may limit the ability of the output data to be paused. For example, a judge at a live performance routine competition may not be able to pause a live performance routine being judged, and pause limit data may emulate this condition, for example where the output data is video or the like of a recorded live performance routine. This feature naturally may be seen to illustrate the practical applicability of the apparatus to emulate a live performance routine competition condition. In some embodiments, pause limit data may be display pause limit data for an input/output means (118).

zoom limit data, for example which may limit the ability of the output data to be zoomed. For example, a judge at a live performance routine competition may not be able to zoom in or out of a live performance routine being judged, and zoom limit data may emulate this condition, for example where the output data is video or the like of a recorded live performance routine. This feature naturally may be seen to illustrate the practical applicability of the apparatus to emulate a live performance routine competition condition. In some embodiments, zoom limit data may be zoom limit data for an input/output means (118).

volume limit data, for example which may limit the ability to adjust volume of output data. For example, a judge at a live performance routine competition may not be able to control the volume of noise (from the performers, from the crowd, etc.) at a live performance routine being judged, and volume limit data may emulate this condition, for example where the output data is video or the like of a recorded live performance routine. This feature naturally may be seen to illustrate the practical applicability of the apparatus to emulate a live performance routine competition condition. In some embodiments, volume limit data may be display volume limit data for an input/output means (118).

playback speed limit data, for example which may limit the ability to adjust a playback speed of output data. For example, a judge at a live performance routine competition may not be able to fast forward or reverse a live performance routine being judged, and playback speed limit data may emulate this condition, for example where the output data is video or the like of a recorded live performance routine. This feature naturally may be seen to illustrate the practical applicability of the apparatus to emulate a live performance routine competition condition. In some embodiments, playback speed limit data may be display playback speed limit data for an input/output means (118).

serial playback limit data, which may limit the ability to serially play back output data. For example, a judge at a live performance routine competition may be required to judge live performance routines serially (e.g., one after another), and serial playback limit data may emulate this condition, for example where the output data is video or the like of a recorded live performance routine. This feature naturally may be seen to illustrate the practical applicability of the apparatus to emulate a live performance routine competition condition. In some embodiments, serial playback limit data may be display serial playback limit data for an input/output means (118).

parallel playback limit data, which may limit the ability to play back output data in parallel. For example, a judge at a live performance routine competition may be required to judge live performance routines in parallel (e.g., head-to-head), and parallel playback limit data may emulate this condition, for example where the output data is video or the like of a recorded live performance routine. This feature naturally may be seen to illustrate the practical applicability of the apparatus to emulate a live performance routine competition condition. In some embodiments, parallel playback limit data may be display parallel playback limit data for an input/output means (118).

order sequence playback limit data, which may limit the ability to change the order of output data. For example, a judge at a live performance routine competition may be required to judge live performance routines in a specific order (e.g., from lowest qualifier to highest qualifier), and order sequence playback limit data may emulate this condition, for example where the output data is video or the like of a recorded live performance routine. This feature naturally may be seen to illustrate the practical applicability of the apparatus to emulate a live performance routine competition condition. In some embodiments, order sequence playback limit data may be display order sequence playback limit data for an input/output means (118).

time block playback limit data, which may limit the ability to extend or otherwise deviate from a time block of the output data. For example, a judge at a live performance routine competition may be required to judge live performance routines in specified blocks of time, and time block playback limit data may emulate this condition, for example where the output data is video or the like of a recorded live performance routine. This feature naturally may be seen to illustrate the practical applicability of the apparatus to emulate a live performance routine competition condition. In some embodiments, time block playback limit data may be display time block playback limit data for an input/output means (118).

In some embodiments, a data transformation processor (1112) may be a competition judging input data transformation processor (1115) configured to automatically create input limit data (1116) for competition judging input data (1111) input through an input/output means (118). Input limit data (1116) may be competition judging input data (1111) that is transformed to limit its scope in a manner that may emulate or facilitate the emulation of a live performance routine competition condition. For example, as so transformed, the data may be input by the judge via the input/output means (118), and may emulate judging, scoring, evaluation or the like that has been affected by or otherwise subjected to a live performance routine competition condition.

Specific examples of input limit data (1116) in various embodiments may include:

judge qualifications compensation limit data, which may limit the judging input data in manner that reflects one or more qualifications criteria of the judge from which the data was input that otherwise may be appurtenant to a live performance routine competition. This feature naturally may be seen to illustrate the practical applicability of the apparatus to emulate a live performance routine competition condition.

judge score weighting limit data, which may limit the judging input data from one or more judges by weighting it differently than the judging input data from one or more other judges based on one or more criteria that otherwise might be appurtenant to a live performance routine competition. This feature naturally may be seen to illustrate the practical applicability of the apparatus to emulate a live performance routine competition condition.

In some embodiments, a data transformation processor (1112) may be a judging input validation data transformation processor (1127) configured to automatically create judgment validated data (1128) for normalized capture limit compliant live cheerleading routine data (1125), as such terms may be described elsewhere herein. Judgment validated data (1128) may be simply such normalized capture limit compliant live cheerleading routine data (1125) which has been transformed to either or both of output limit data (1114) or input limit data (1116), and embodiments may involve allocated memory (115) capable of access to and being accessed through a networked environment (112) and configured to automatically store such judgment validated normalized capture limit compliant live cheerleading routine data (1129).

In some embodiments, a data transformation processor (1112) may be a live performance routine data transformation processor (1113) configured to automatically create normalization data (1117) for live performance routine data (116). Normalization data (1117) may be data tending to conform one or more aspects of live performance routine data (116) to a norm, standard, or the like. In some embodiments, this may involve transforming variables in a plurality of live performance routine data (116) to a common norm or standard, and reflecting such transformed variables as normalization data (1117) for each such live performance routine data (116). Normalization data (1117) may be an illustration of the practical applicability of the apparatus described herein, because when multiple live performance routines are recorded by multiple performers at multiple remote locations (114), the resulting recorded live performance routines may vary greatly in sound, appearance, and overall impression. Normalization data (1117) may tend to reduce or eliminate such variables, making recorded live performance routines more like live performance routines taking place at an actual live performance routine competition, where all such routines may be performed under generally similar conditions. Moreover, discussion herein of "normalization" data and/or "normalization data" should be understood to encompass disclosure of data that is "normalized" or "normalized data" as context requires or as otherwise would fall within the understanding of a person having ordinary skill in the art.

Specific examples of normalization data (1117) in various embodiments may include:

perspective compensation limit data, for example which may or may tend to normalize perspective information embodied in live performance routine data (116). In some embodiments, for example, the live performance data may be video or the like of a recorded performance routine, and the perspective at which the performance is presented may be shifted, adjusted, or otherwise altered to conform to a standard perspective, which may tend to emulate that a judge at a live performance routine competition may judge a performance routine from a given perspective, and that the perspective may be the same for all performance routines judged. This feature naturally may be seen to illustrate the practical applicability of the apparatus to emulate a live performance routine competition condition.

multiple camera compensation limit data, for example which may limit or eliminate multiple camera information embodied in live performance routine data (116). In some embodiments, for example, the live performance data may be video or the like of a recorded performance routine that may have footage from multiple cameras. Some or all of the footage from more than a first camera may be limited or eliminated, which may tend to emulate that a judge at live performance routine competition may judge a performance routine from a given viewpoint, and that the viewpoint may be the same for all performance routines judged. This feature naturally may be seen to illustrate the practical applicability of the apparatus to emulate a live performance routine competition condition.

soundtrack compensation limit data, which may limit or eliminate soundtrack information embodied in live performance routine data (116). In some embodiments, for example, the live performance data may be video or the like of a recorded performance routine that may have a soundtrack having attributes such as volume, tempo, or the like. Some or all attributes of the soundtrack may be altered or eliminated to conform the soundtrack to what may be presented at an actual live performance routine competition. This feature naturally may be seen to illustrate the practical applicability of the apparatus to emulate a live performance routine competition condition.

background compensation limit data, which may limit or eliminate background information embodied in live performance routine data (116). In some embodiments, for example, the live performance data may be video or the like of a recorded performance routine having a background. The background may be altered or eliminated to reflect, for example, only backgrounds that are technically capable or otherwise permitted at a live performance routine competition. This feature naturally may be seen to illustrate the practical applicability of the apparatus to emulate a live performance routine competition condition.

aspect ratio compensation limit data, which may alter or change aspect ratio information embodied in live performance routine data (116). In some embodiments, for example, the live performance data may be video or the like of a recorded performance routine having an aspect ratio, and the aspect ratio may be changed or altered to conform to a standard so as to promote similarity among various live performance routine data (116). This feature naturally may be seen to illustrate the practical applicability of the apparatus to emulate a live performance routine competition condition.

figure-to-ground compensation limit data, which may alter or change figure-to-ground information embodied in live performance routine data (116). In some embodiments, for example, the live performance data may be video or the like of a recorded performance routine having proportional relationships of figures to ground, and the figure-to-ground proportions may be changed or altered to conform to a standard so as to promote similarity among various live performance routine data (116). This feature naturally may be seen to illustrate the practical applicability of the apparatus to emulate a live performance routine competition condition.

extraneous subject matter scrubbing limit data, which may alter or eliminate extraneous subject matter information embodied in live performance routine data (116). In some embodiments, for example, the live performance data may be video or the like of a recorded performance routine having subject matter extraneous to the live performance routine, and such extraneous subject matter may be altered or eliminated. This feature naturally may be seen to illustrate the practical applicability of the apparatus to emulate a live performance routine competition condition.

prejudicial subject matter scrubbing limit data, which may alter or eliminate prejudicial subject matter information embodied in live performance routine data (116). In some embodiments, for example, the live performance data may be video or the like of a recorded performance routine having prejudicial subject matter (e.g., "Team X, 2020 World Champions"), and such prejudicial subject matter may be altered or eliminated. This feature naturally may be seen to illustrate the practical applicability of the apparatus to emulate a live performance routine competition condition.

Moreover, various embodiments may involve a normalization data transformation processor (1123) configured to automatically create normalized data for capture limit compliant live cheerleading routine data, as such terms may be discussed elsewhere herein.

In some embodiments, a data transformation processor (1112) may be a live performance routine data transformation processor (1113) configured to automatically create capture limit compliance data (1118) for live performance routine data (116). Capture limit compliance data (1118) may be live performance routine data (116) that is transformed into data that confirms or corroborates that the recording of a live performance routine complies with capture requirements that emulate or may be intended to emulate live performance routine competition conditions. In some embodiments, capture limit compliance data (1118) may be performance routine capture limit compliance data (1118), such as wherein a data transformation processor (1112) may transform live performance routine data (116) to confirm or corroborate that requirements for the recorded live performance routine were complied with at the point of capture. Specific examples of performance routine capture limit compliance data (1118) in various embodiments may include:

number of attempts capture limit compliance data, such as wherein the data may embody information on the number of performance routine attempts that were recorded and may confirm or corroborate the number as falling within an acceptable limit. This feature naturally may be seen to illustrate the practical applicability of the apparatus to emulate a live performance routine competition condition, as limits on the number of attempts of a performance routine may generally be a feature of live performance routine competition.

best attempt capture limit compliance data, such as wherein the data may embody a selection by performers, judges, or other competition participants of one recorded live performance routine as the being the best for competition purposes, such as judging or the like. This feature naturally may be seen to illustrate the practical applicability of the apparatus to emulate a live performance routine competition condition, as live performance routine competition may sometimes allow for multiple attempts, with the best-made attempt being selected for judging or other competition purposes.

first attempt capture limit compliance data, such as wherein the data may embody information on whether a recorded live performance routine was the first attempt. This feature naturally may be seen to illustrate the practical applicability of the apparatus to emulate a live performance routine competition condition, as live performance routine competition often involves limiting performance routines to a single attempt.

performance routine required elements capture limit compliance data, such as wherein the data may embody information on whether one or more elements of a performance routine (e.g., jumps, runs, tumbles, etc.) were present in a recorded live performance routine. This feature naturally may be seen to illustrate the practical applicability of the apparatus to emulate a live performance routine competition condition, as live performance routine competition generally requires the inclusion of required performance routine elements into performance routines. Some embodiments may involve cheerleading routine required elements capture limit compliant data.

performance routine rules capture limit compliance data, such as wherein the data may embody information on whether one or more rules of a live performance routine competition (e.g., age limits, difficulty limits, number of persons limits, etc.) have been complied with in a recorded live performance routine. This feature naturally may be seen to illustrate the practical applicability of the apparatus to emulate a live performance routine competition condition, as live performance routine competitions generally have competition rules that performers are required to adhere to. Some embodiments may involve cheerleading routine rules capture limit compliant data.

performance routine time restrictions capture limit compliance data, such as wherein the data may embody information on whether time restrictions (e.g., a time limit on permissible length of a live performance routine) have been complied with in a recorded live performance routine. This feature naturally may be seen to illustrate the practical applicability of the apparatus to emulate a live performance routine competition condition, as live performance routine competition often involves placing time restrictions on live performance routines. Some embodiments may involve cheerleading routine time restrictions capture limit compliant data.

In some embodiments, capture limit compliance data (1118) may be technical capture limit compliance data (1118), such as wherein a data transformation processor (1112) may transform live performance routine data (116) to confirm or corroborate that requirements for the technical capture of a recorded live performance routine were complied with. Specific examples of technical capture limit compliance data (1118) in various embodiments may include:

perspective capture limit compliance data, such as wherein the data may embody information whether perspective requirements for a recording means (113) (e.g., the height, angle, and location of a video camera) have been complied with in a recorded live performance routine. This feature naturally may be seen to illustrate the practical applicability of the apparatus to emulate a live performance routine competition condition, as viewers of a live performance routine competition (e.g., judges, spectators, other performers) may typically view live performance routines from a single perspective.

multiple camera capture limit compliance data, such as wherein the data may embody information on whether multiple camera requirements (e.g., no more than one camera) have been complied with in a recorded live performance routine. This feature naturally may be seen to illustrate the practical applicability of the apparatus to emulate a live performance routine competition condition, as live performance routine competition generally may not have the ability to rapidly shift views of a live performance routine in the manner of footage edited to incorporate the use of multiple cameras.

soundtrack capture limit compliance data, such as wherein the data may embody information on whether requirements for soundtrack attributes (e.g., volume, tempo, etc.) have been complied with in a recorded live performance routine. This feature naturally may be seen to illustrate the practical applicability of the apparatus to emulate a live performance routine competition condition, as live performance routine competition generally may have requirements for soundtrack attributes such as volume, tempo, etc.

background capture limit compliance data, such as wherein the data may embody information on whether requirements for the backgrounds against which a recorded live performance routine is captured have been complied with. This feature naturally may be seen to illustrate the practical applicability of the apparatus to emulate a live performance routine competition condition, as live performance routine competition generally may involve competing live performance routines generally taking place within spaces having similar or common backgrounds.

aspect ratio capture limit compliance data, such as wherein the data may embody information on whether aspect ratio requirements for a recorded live performance routine have been complied with. This feature naturally may be seen to illustrate the practical applicability of the apparatus to emulate a live performance routine competition condition, as variability in the aspect ratios for recorded live performance routines may tend to create dissimilarities in viewing experience that may not be present in live performance routine competition.

figure-to-ground capture limit compliance data, such as wherein the data may embody information on whether requirements for the proportions of figure-to-ground (e.g., how much space performers take up on screen in a video recording) for a recorded live performance routine have been complied with. This feature naturally may be seen to illustrate the practical applicability of the apparatus to emulate a live performance routine competition condition, as variability in the figure-to-ground proportions for recorded live performance routines may tend to create dissimilarities in viewing experience that may not be present in live performance routine competition.

extraneous subject matter capture limit compliance data, such as wherein the data may embody information on whether requirements prohibiting or otherwise regulating subject matter extraneous to a recorded live performance routine have been complied with. This feature naturally may be seen to illustrate the practical applicability of the apparatus to emulate a live performance routine competition condition, as matter extraneous to a live performance routine generally may be prohibited or regulated in live performance routine competition.

prejudicial subject matter capture limit compliance data, such as wherein the data may embody information on whether requirements prohibiting or otherwise regulating prejudicial subject matter (e.g., texts or banners with promotional information such as "Team X, 2020 World Champions") have been complied with. This feature naturally may be seen to illustrate the practical applicability of the apparatus to emulate a live performance routine competition condition, as prejudicial subject matter generally may be prohibited or regulated in live performance routine competition.

Moreover, various embodiments may involve a first capture limit compliance data transformation processor (1122) configured to automatically create first capture limit compliant data (1118) for first live cheerleading routine data and a second capture limit compliance data transformation processor (1122) configured to automatically create second capture limit compliant data (1118) for second live cheerleading routine data. Discussion herein of "compliance" data should be understood to encompass disclosure of data that is "compliant" as context requires or as otherwise would fall within the understanding of a person having ordinary skill in the art.

In some embodiments, a live performance routine competition conditions emulation apparatus (111) may have a fourth allocated memory (115) capable of access to and being accessed through a networked environment (112) and configured to automatically store live performance routine competition conditions emulated data (117) as digitally altered video (1135) configured for playback through a video playback means. The nature of the digitally altered video (1135) may be as described herein for emulating one or more live performance routine competition conditions, and such a stored video may be a practical application of the apparatuses described herein by which live performance routine competitions may be emulated in a manner that avoids the need for staging an actual live performance routine competition. Some embodiments may involve a fourth allocated memory (115) capable of access to and being accessed through a networked environment (112) and configured to automatically store aggregated judgment validated normalized capture limit compliant live cheerleading routine data (1131) as digitally altered cheerleading competition video (1135) configured for playback through a video playback means, as such terms may be described elsewhere herein.

The live performance routine competition conditions emulation apparatus (111) in various embodiments may have a live performance routine competition conditions emulated data aggregator (1119) capable of access to and being accessed through a networked environment (112) and configured to automatically aggregate live performance routine competition conditions emulated data (117) into an emulated live performance routine competition (1120).

As described herein, live performance routine competition conditions emulated data (117) in some embodiments may be produced, generated, created, and the like by the apparatus described herein from multiple sources and may exist as multiple data objects in multiple locations. A live performance routine competition conditions emulated data aggregator (1119) may be hardware and/or software that may aggregate a plurality of live performance routine competition conditions emulated data (117) into a specific format. Naturally, such data may be aggregated in a variety of manners resulting in a variety of formats, potentially capable of being put to a variety of uses.

Some embodiments may involve aggregating such data into an emulated live performance routine competition (1120). This naturally would not be an actual live performance routine competition, but may involve emulating an actual live performance routine competition in such a way that an actual live performance routine competition need not be staged, for example by including emulated live performance routine competition conditions in manners such as may be described herein. The capability to emulate an actual live performance routine competition without the actual staging of such a live performance routine competition may be understood to be a practical application of the apparatuses disclosed herein. Some embodiments may involve a live cheerleading competition conditions emulated data aggregator (1130) capable of access to and being accessed through a networked environment (112) and configured to automatically aggregate judgment validated normalized capture limit compliant live cheerleading routine data (1129) into an emulated live cheerleading competition (1132).

The live performance routine competition conditions emulation apparatus (111) in various embodiments further may have an emulated live performance routine competition spectator portal (1121) capable of access to and being accessed through a networked environment (112) and configured to automatically stage an emulated live performance routine competition (1120) for remote spectator access. Portals may be generally known and understood for the technical field described herein, and for the inventive technology may be understood to involve hardware and/or software providing an interface by which remote spectators or other like persons can access and consume an emulated live performance routine competition (1120). Examples of portals in some embodiments may include websites, smartphone apps, and the like. Remote spectators simply may be spectators that are separated, apart, distant, or situated at some distance away from one another and from performers, judges, and other competition participants, and in various embodiments may include locations simply different than or removed from a conventional site or location at which a live performance routine competition otherwise might be staged. Some embodiments may involve an emulated live cheerleading competition spectator portal (1121) capable of access to and being accessed through a networked environment (112) and configured to automatically stage an emulated live cheerleading competition (1132) for remote spectator access.

Because live performance routine competition conditions emulated data (117) in various embodiments may be aggregated in a variety of ways to produce different kinds of emulated live performance routine competitions (1120), a variety of formats and consumption of such emulated live performance routine competitions (1120) may be possible. Specific examples of emulated live performance routine competitions (1120) in various embodiments that an aggregator may be configured to create may include:

- a fixed format aggregated emulated live performance routine competition, such as wherein the emulated live performance routine competition is fixed in form and presentation. This may be analogous to conventional over-the-air broadcast of live performance routine competitions in some embodiments. Some embodiments may involve a fixed format aggregated emulated live cheerleading competition.
- A selectively formatted aggregated emulated live performance routine competition, such as wherein the formatting may permit a degree of flexibility in the presentation and consumption of the emulated live performance routine competition, for example wherein remote spectators may be able to select only specific live performance routines for consumption. Some embodiments may involve a selectively formatted aggregated emulated live cheerleading competition.
- An unformatted aggregated emulated live performance routine competition, such as wherein all live performance routine competition conditions emulated data (117) may be made available in an unformatted aggregate, and for which remote spectators or the like may have unrestricted access to consume in any manner. Some embodiments may involve an unformatted aggregated emulated live cheerleading competition.
- An open access emulated live performance routine competition, such as wherein remote spectator access to the emulated live performance routine competition may be open to any and all remote spectators. Some embodiments may involve an open access emulated live cheerleading competition.
- A restricted access emulated live performance routine competition, such as wherein remote spectator access to the emulated live performance routine competition may be restricted. Any suitable restrictions consistent with the inventive principles described herein may be utilized, and in some embodiments such restrictions may involve making remote spectator access by invitation only. Some embodiments may involve a restricted access emulated live cheerleading competition.
- A spectator participatory emulated live performance routine competition, such as wherein remote spectators may be able to create and contribute content to the emulated live performance routine competition. In some embodiments, for example, such content may be in the form of likes, claps, comments, etc. Some embodiments may involve a spectator participatory emulated live cheerleading competition.
- A spectator non-participatory emulated live performance routine competition, such as wherein remote spectators may not be able to create and contribute content to the emulated live performance routine competition. Some embodiments may involve a spectator non-participatory emulated live cheerleading competition.

Naturally, in some embodiments a live cheerleading competition conditions emulated data aggregator (1130) may be an aggregator configured to automatically create an emulated live cheerleading competition (1132).

Figure 5A:
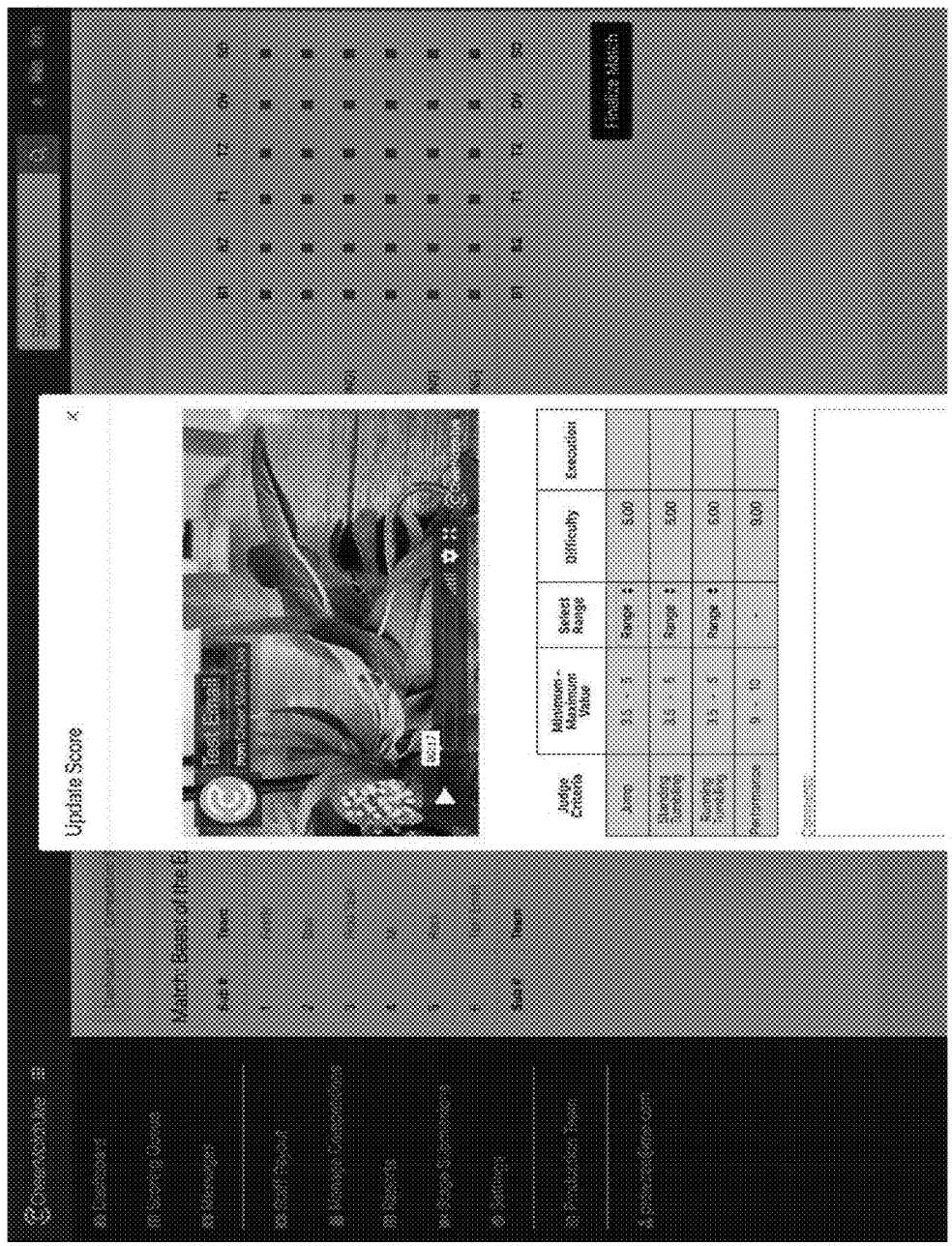
FIGS. 5A-5P show exemplary screen shots in accordance with some exemplary embodiments of the present inventive technology.
Figure 5B:
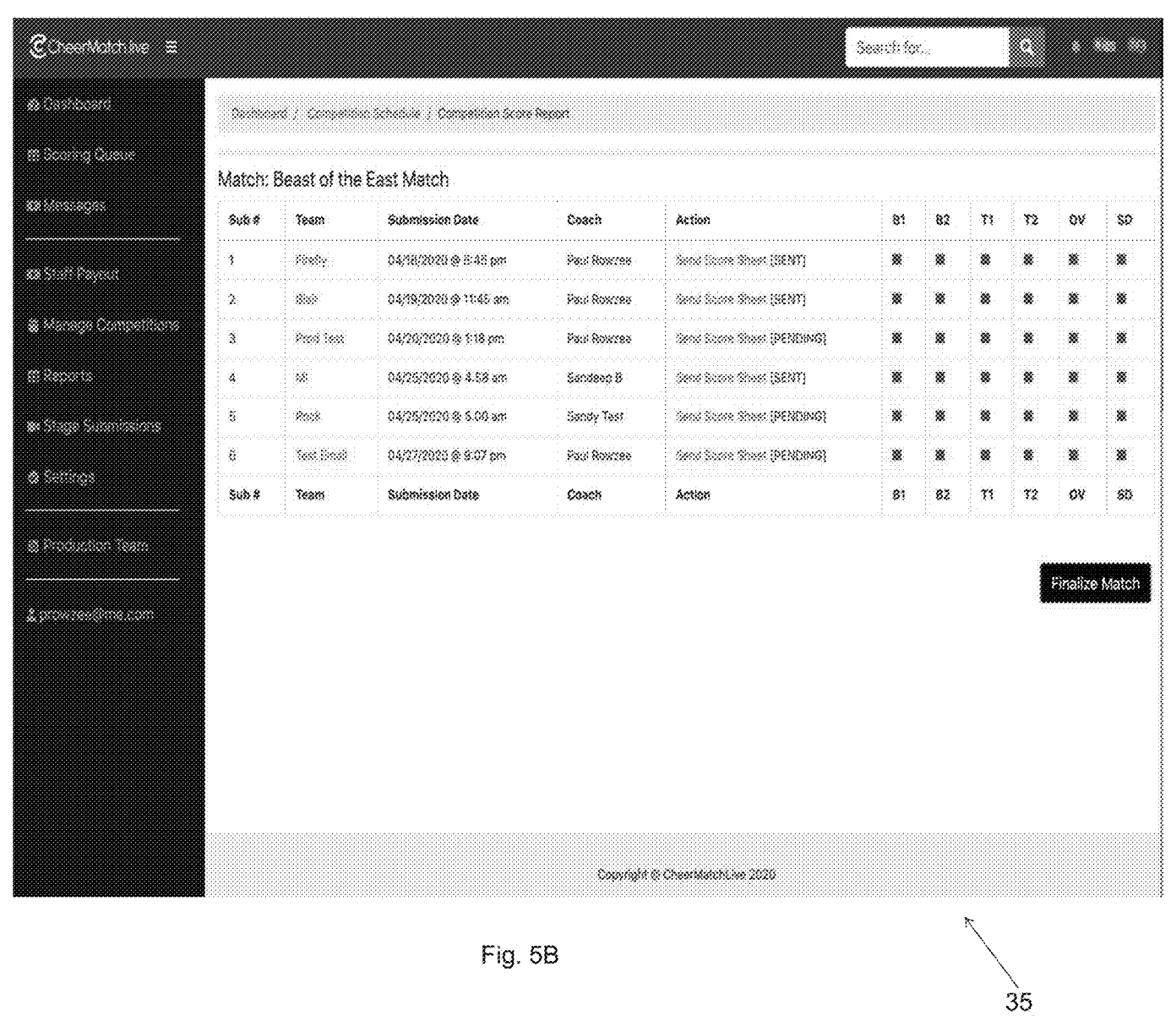
Figure 5C:
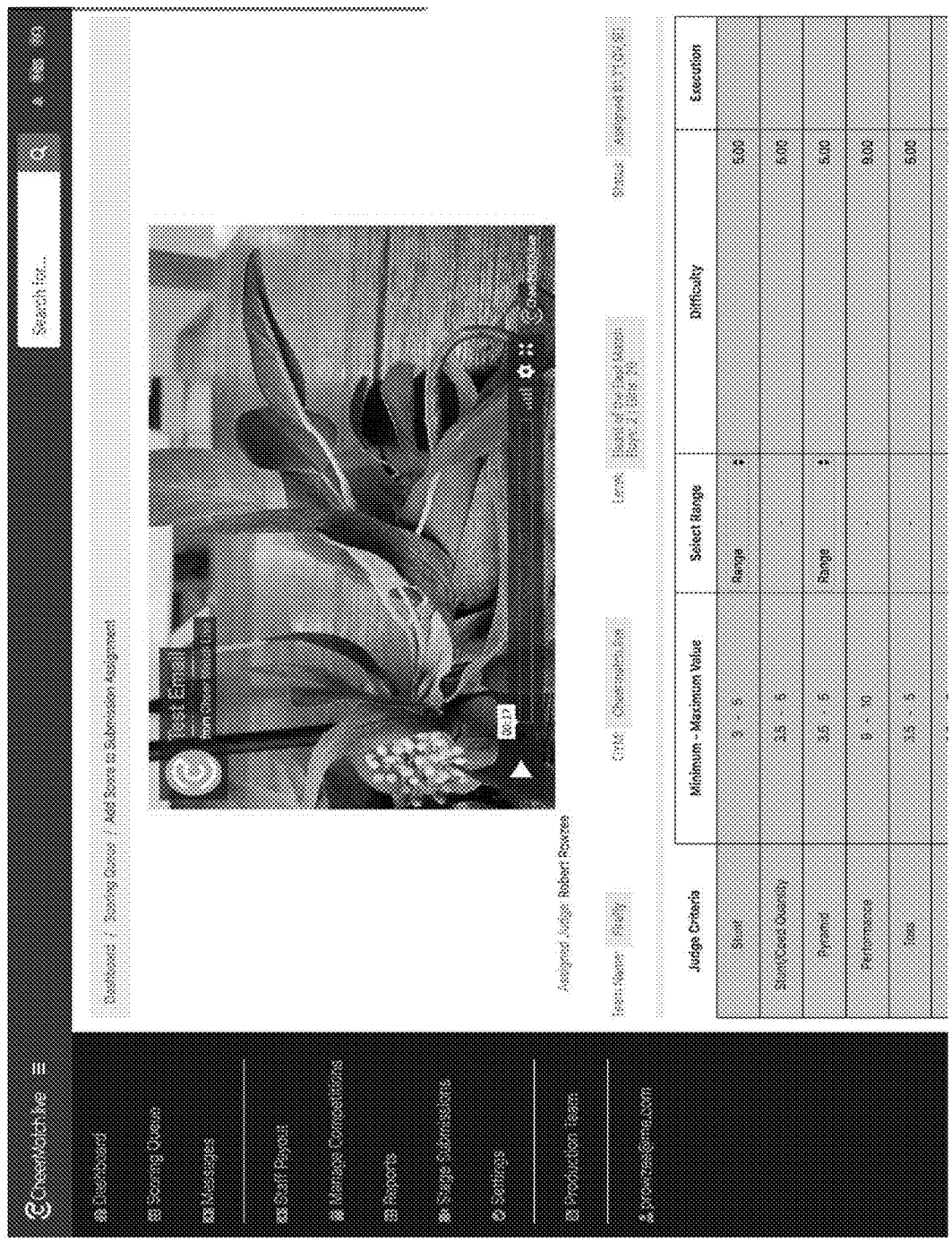
Figure 5D:
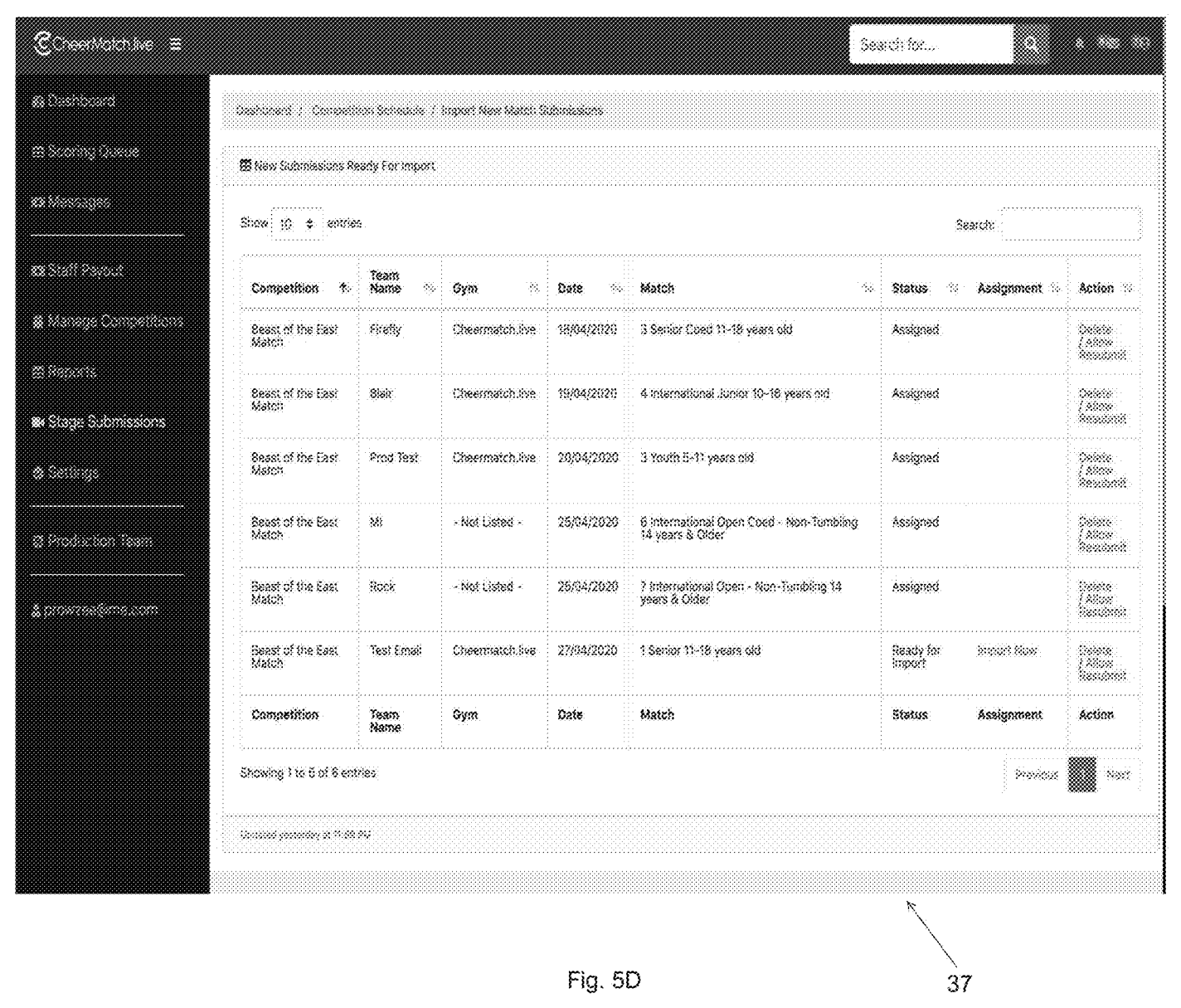
Figure 5E:
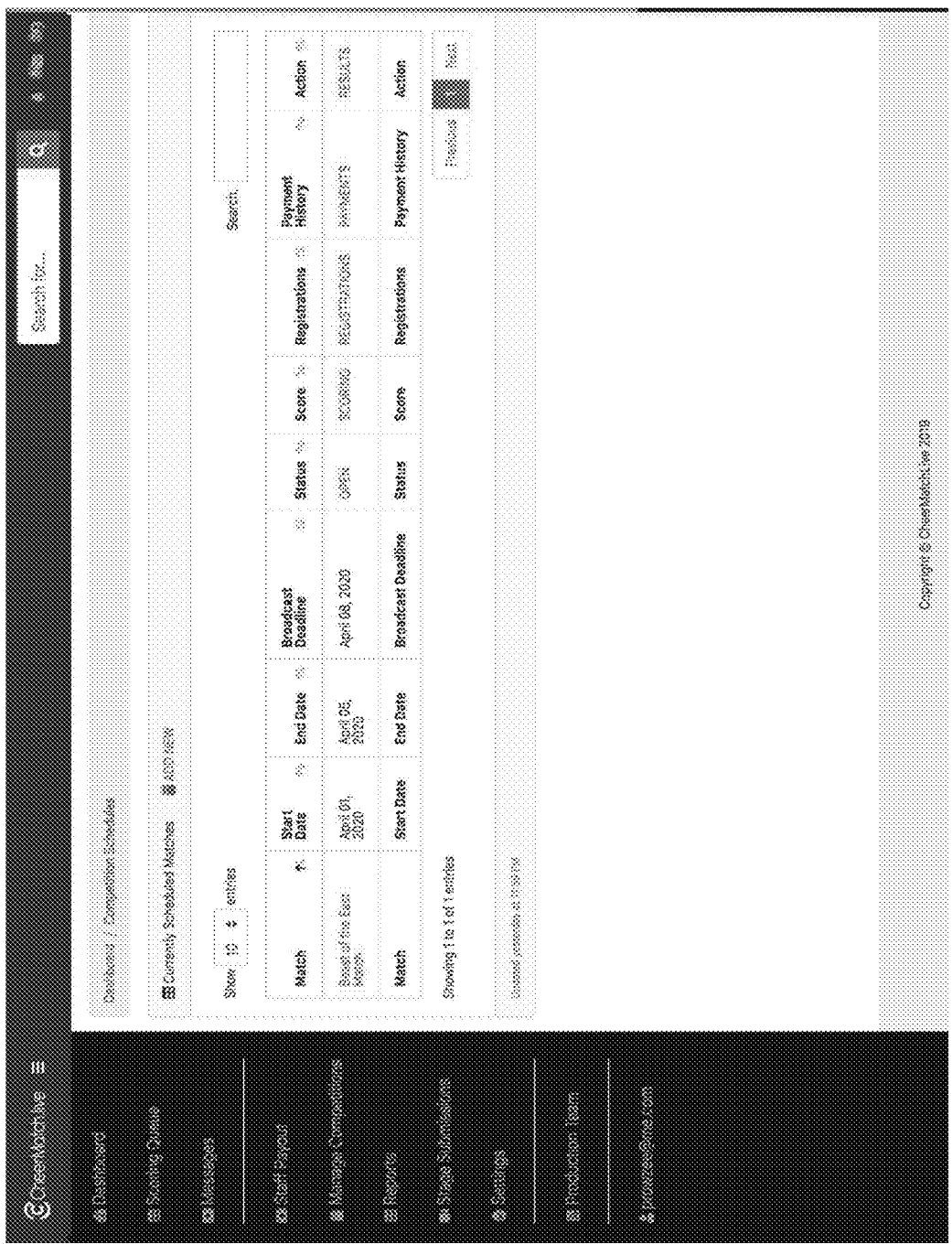
Figure 5G:
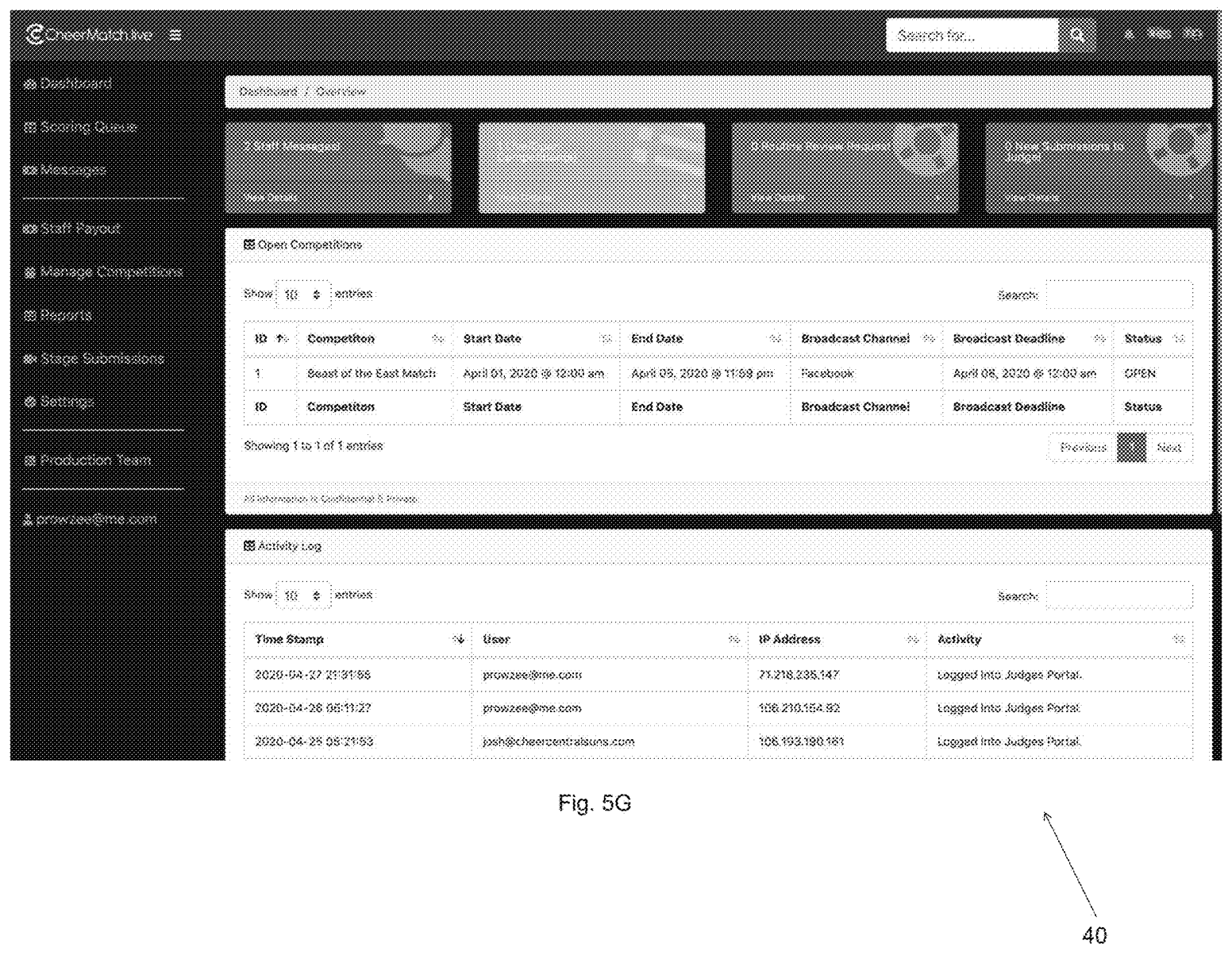
Figure 5L:
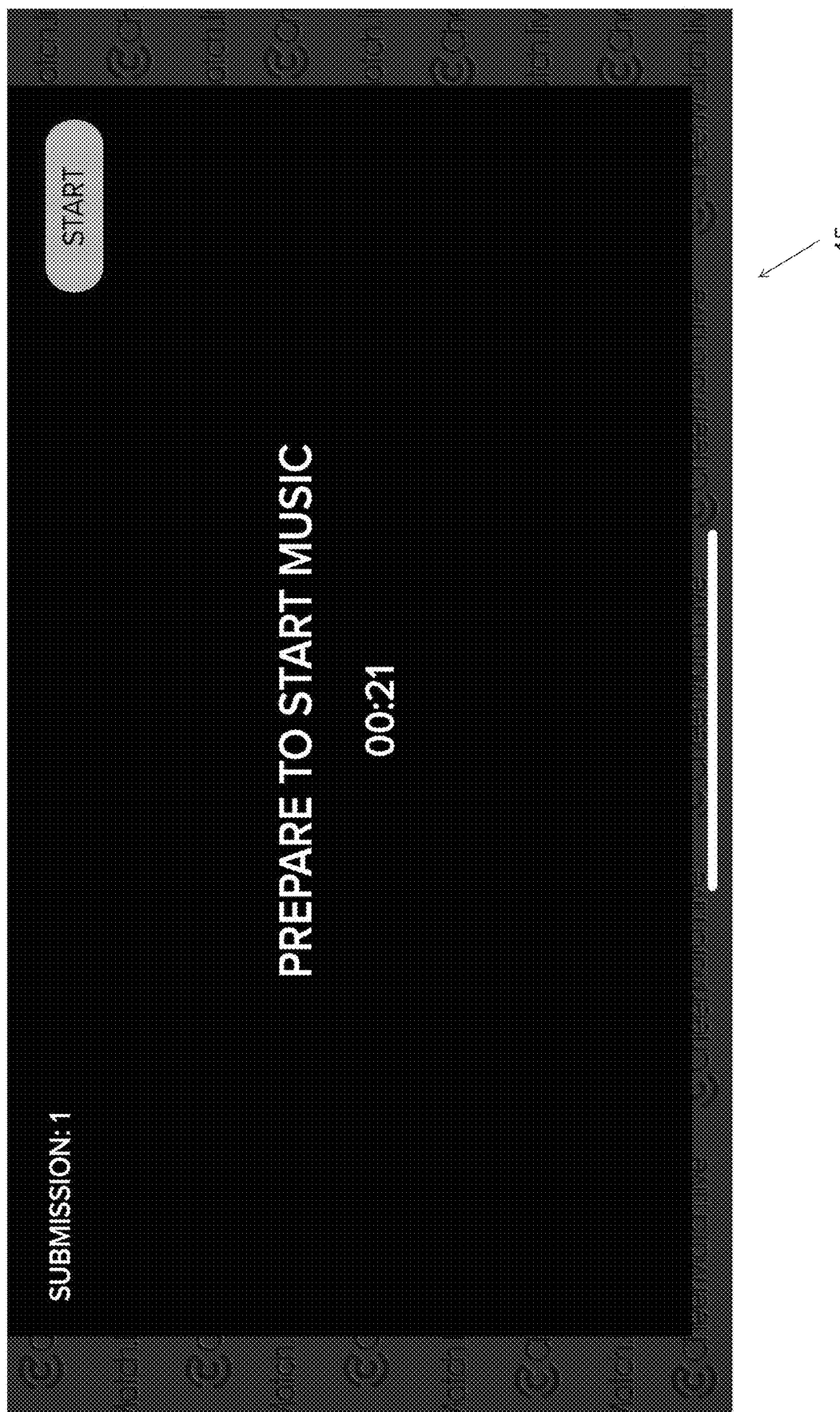
Figure 5M:
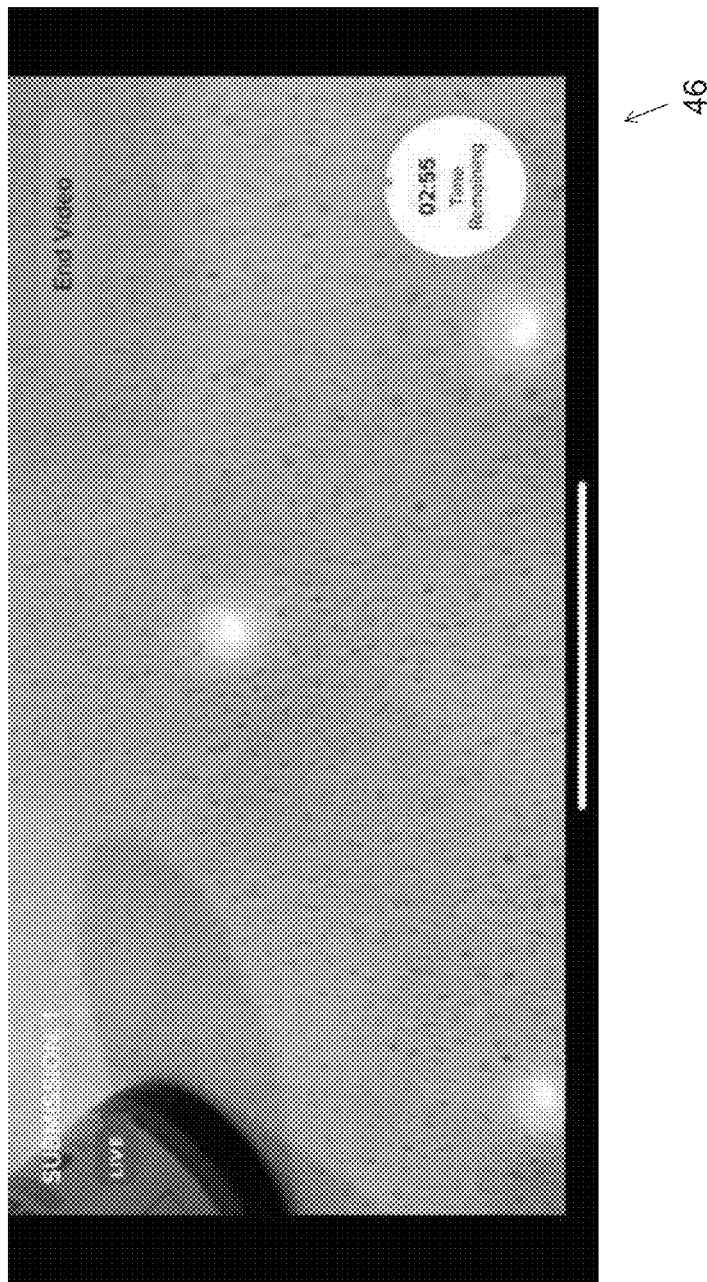
Figure 5N:
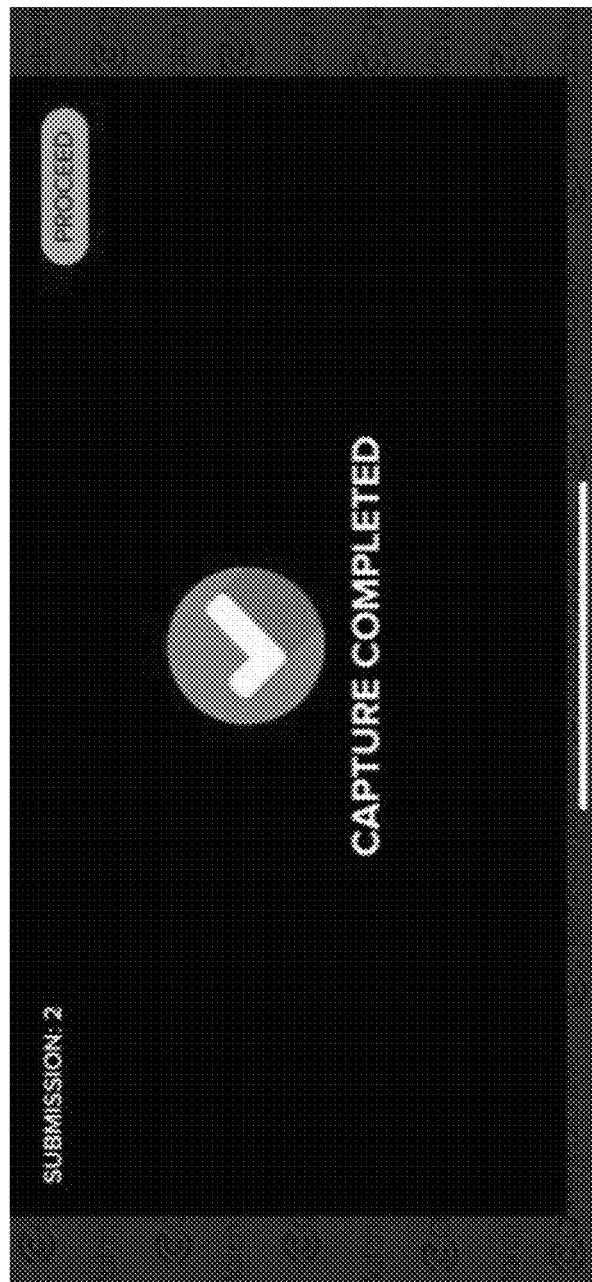

FIGS. 5A-5P may show embodiments that, if desired, may include a variety of functions as exemplified in various screenshots, accessible by various app users. FIG. 5A shows an exemplary screenshot of a judging display (34), which if desired to be included, can enable a judge to access, view, and submit various items including but not limited to aspects relevant to that particular competition, perhaps such as for some sports: a jump score, a standing tumbling score, a running tumbling score, and a performance score as but a few examples. FIG. 5B shows an exemplary screenshot of an example competition score report (35), possibly accessible through a judge's installation and use configuration element (20). If desired to be included, this could include a score report for each competition, possibly organized by date, alphabetically, by final score, or any other identifying factor. FIG. 5C shows an exemplary screenshot of an example screen allowing a judge to add their score(s) to a submission assignment (36), possibly accessible through a judge's installation and use configuration element (20). If desired to be included, judges could utilize this to submit their scores and comments to each specific performance or competition. FIG. 5D shows an exemplary screenshot of an example screen allowing a judge to import their new match submissions (37), possibly accessible through a judge's installation and use configuration element (20). FIG. 5E shows an exemplary screenshot of an example screen showing competition schedules (38), possibly accessible through a judge's installation and use configuration element (20). If desired to be included, judges could use this feature to see their upcoming schedule, or to see any and/or all scheduled competitions. FIG. 5F shows an exemplary screenshot of an example screen showing a submission score queue (39), possibly accessible through a judge's installation and use configuration element (20). FIG. 5G shows an exemplary screenshot of an example screen showing a possible example of a dashboard overview (40), possibly accessible through a judge's installation and use configuration element (20). If desired to be included, the dashboard overview could feature buttons with direct access to features in the judge's portal, it could also include a plethora of other quick-access buttons or even information including but not limited to all of their upcoming scheduled competitions for performances to judge, and which other judges are online. FIG. 5H shows an exemplary screenshot of an example login screen to allow access to a judges installation (41) and use configuration element (20). FIG. 5I shows an exemplary screenshot of an example screen possibly seen upon opening the app, allowing a user to get started (42). FIG. 5J shows an exemplary screenshot of an example login screen (43) to allow access to a spectator/viewing installation and use configuration element (17) or a competitor installation and use configuration element (20). If desired to be included, this screen, or a similar screen could be viewable to a spectator and/or fan and could provide access to all features that may be set to "spectator access." FIG. 5K shows an exemplary screenshot of an example screen prompting a user to capture and submit a video (44), perhaps using a video performance capture feature (11). If desired to be included, this would allow users to capture video directly in the app itself. In other embodiments, it may be possible to upload to the app a video that was taken outside of the app. FIG. 5L shows an exemplary screenshot of an example screen preceding a capture of a video performance (45), possibly using a video performance capture feature (11). FIG. 5M shows an exemplary screenshot of an example video being captured (46), possibly by the video performance capture feature (11). FIG. 5N shows an exemplary screenshot of an example screen shown after a video performance or competition has been captured (47). If desired to be included, this could: automatically evaluate and ensure a user that the video was submitted successfully, enable a user to re-record if they are not satisfied with their video, or any other desired options. FIG. 5O shows an exemplary screenshot of an example screen allowing a user to submit a previously-captured video of a performance or competition (48). FIG. 5P shows an exemplary screenshot of an example screen verifying a successful submission of a previously-captured video of a performance or competition (49). If desired to be included, this screen could also show if a previously-captured video of a performance or competition (49) was not uploaded successfully.

Figure 6:
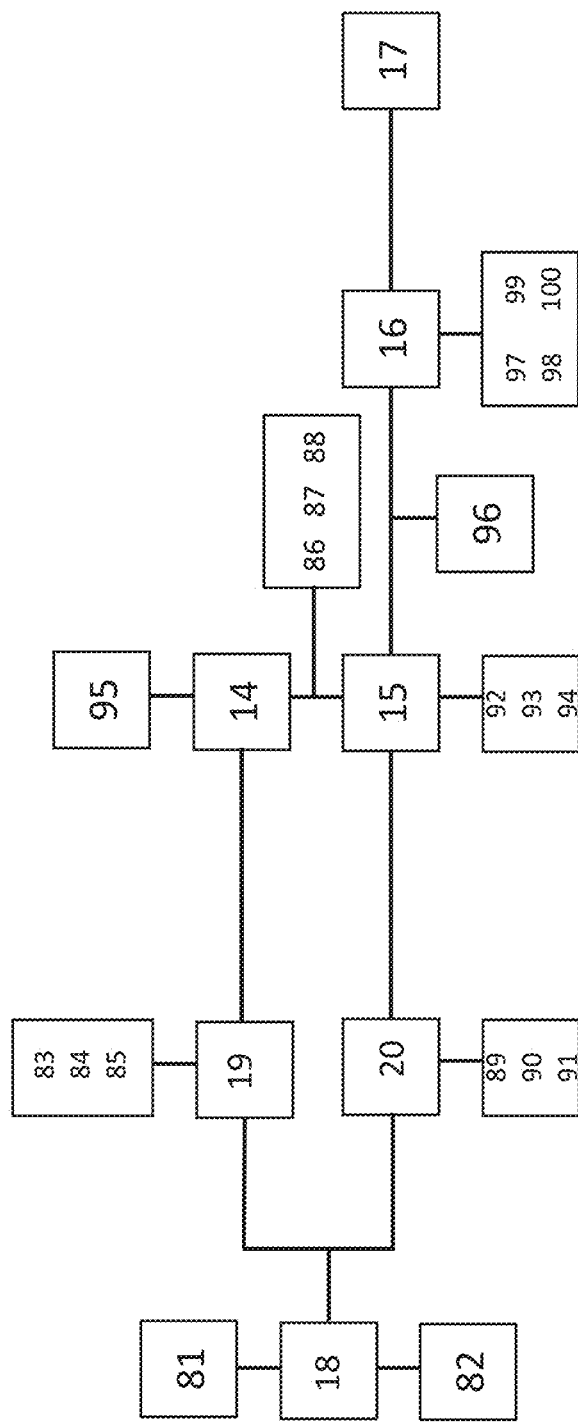
FIG. 6 shows an additional representative flow chart of an alternative closely connected process in accordance with one exemplary embodiment of the present inventive technology.

As shown with reference to FIG. 6, embodiments, if desired may include any one or combination, including permutations and combinations, of any of the following features. In one embodiment there may be included, a rules definition element (18) which can include an automatic defined and accepted competition rules of this particular competition program element (81), subroutine, or computer-aided automatic functionality. If desired to be included, this can act to automatically define competition rules, to automatically cause acceptance of competition rules, and can even be configured to establish rules for a particular competition, if desired. Also included as part of the rules definition element (18) could be an automatic defined and accepted judging criteria program element, subroutine, or computer-aided automatic functionality (82). If desired to be included, this can act to automatically define and accept certain desired judging criteria. The competitor installation and use configuration element (19), used by competitors or performers, may contain an automatic participant registration and threshold criteria determination program element, subroutine, or computer-aided automatic functionality (83). If desired to be included, this can act to automatically determine, perhaps via elements, subroutines, or other computer-aided functionality, whether the participant meets the threshold criteria. An automatic rules compliance rejection or compliance suggestion program element, subroutine, or computer-aided automatic functionality (84) can also be included. If desired to be included, this can act to automatically determine whether certain set rules (23) have been complied with during a competition or other performance. If the certain set rules (23) were not complied with, the automatic rules compliance rejection or compliance suggestion program element, subroutine, or computer-aided automatic functionality (84) could, for example, issue a rejection to the participants and/or suggest ways to ensure compliance via a program element, subroutine, or computer aided automatic functionality. Communicative to the automatic rules compliance rejection or compliance suggestion program element, subroutine, or computer-aided automatic functionality (84) could be an automatic timing and number of attempts program element, subroutine, or computer-aided automatic functionality (85). If desired to be included, this can act to automatically log and time the number of attempts of a performance or competition, to ensure compliance with set rules (23). In embodiments of the present inventive technology, an automatic judge training or certification program element, subroutine, or computer-aided automatic functionality (89) may be accessible or otherwise associated with the judges' installation and use configuration element (20). If desired to be included, this can act to achieve higher level training or to assure appropriate certification for that particular competition. An automatic judge certification currency assurance or statistical fairness program element, subroutine, or computer-aided automatic functionality (90) may also be accessible or otherwise associated with the judges' installation and use configuration element (20). If desired to be included, this can act to automatically assure judges' qualifications are current at the time of the competition and/or can assess judges in some fashion, perhaps even for statistical indication of fairness in even an automatic fashion. An automatic judge or participant or competition linking program element, subroutine, or computer-aided automatic functionality (91) may also be accessible or otherwise associated with the judges' installation and use configuration element (20). If desired to be included, this can act to automatically link judges and participants, competitors, or competitions. In this and possibly in other embodiments, the performance capture element (14) may include an automatic performance capture format compliance program element, subroutine, or computer-aided automatic functionality (95). If desired to be included, this can act to automatically verify that a video-captured performance is in compliance with the set rules (23) via an element, subroutine, or computer-aided automatic functionality. Associated with the performance capture element (14) and/or the judge upload for competition element (15) may be an automatic performance similarization program element, subroutine, or computer-aided automatic functionality (86). If desired to be included, this can act to similarize performances for judging to at least some degree, such as to make vantage points, or performance effects such as music, beat presentation, or the like similar perhaps through video or audio manipulation, participant suggesting or requiring, or the like. Also associated with the performance capture element (14) and/or the judge upload for competition element (15) may be an automatic presentation stripping program element, subroutine, or computer-aided automatic functionality (87). If desired to be included, this can act to strip or block elements, perhaps names, identifiers, spectator indications, or such that could be perceived to make judging unfair or the like. Also associated with the performance capture element (14) and/or the judge upload for competition element (15) may be an automatic computer-aided decision or participant effect program element, subroutine, or computer-aided automatic functionality (88). If desired to be included, this can act to provide either early stage or competition level indications for either participants or judges either publicly or privately. In this embodiment, and perhaps in others, the judge upload for competition element (15) may include three possible features. An automatic simultaneous or sequential ordering program element, subroutine, or computer-aided automatic functionality (92) may be included if desired and can act to sequence performances as appropriate for both judges and/or spectators. An automatic inter-judge communication control and/or verification program element, subroutine, or computer-aided automatic functionality (93) could also be included if desired and can act to facilitate or control communication including voice or text messages between judges. An automatic judge or participant invite program element, subroutine, or computer-aided automatic functionality (94) may be desired to be included, and can act to automatically invite judges, participants, spectators or anyone else, to view certain performances or competitions. This could include its own set of spectator-only rules or criteria, and could automatically send invites or special log in access to anyone who meets a certain criterion. As part of the judge upload for competition element (15), an automatic judge entry itemization program element, subroutine, or computer-aided automatic functionality (96) may be provided. If desired to be included, this can act to automatically itemize a judge's or judges' scores or other entries for a particular performance or competition. This automatic judge entry itemization program element, subroutine, or computer-aided automatic functionality (96) can be set to be private, viewable only by other judges, viewable only by judges and participants, or viewable to all, as but a few examples. The automatic judge entry itemization program element, subroutine, or computer-aided automatic functionality (96) could be also communicative to and from the competition activity element (16). And also communicative to and from the competition activity element (16) may be four features, possibly among others. This may include an automatic viewing streaming synchronization choice program element, subroutine, or computer-aided automatic functionality (97). If desired to be included, this can act to automatically allow viewers to observe performance as viewed by judges or as available in raw participant upload options. Another feature may be an automatic judge entered decisions by individual criteria compilation and display program element, subroutine, or computer-aided automatic functionality (98). If desired to be included, this can act to automatically compile and display decisions entered by judges, possibly categorized by individual criteria. Another feature may be an automatic similarized and stripped (if decided to be included in an embodiment) comparison or display program element, subroutine, or computer-aided automatic functionality (99). If desired to be included, this can act to provide spectators views as limited such as for judges. And, yet another feature that could be included may be an automatic winner or ranking result program element, subroutine, or computer-aided automatic functionality (100). If desired to be included, this can act to automatically determine, based on some, any, or all criteria and/or judges' data contained in the judges' installation and use configuration element (20), a winner and or/rankings or other results. In this same embodiment, and perhaps in others, a spectator/viewing installation and use configuration element (17) may also be linked to the competition activity element (16).

As can be easily understood from the foregoing, the basic concepts of the various embodiments of the present invention(s) may be embodied in a variety of ways. It involves both live performance routine competition conditions emulating techniques as well as devices to accomplish the appropriate live performance routine competition conditions emulation. In this application, the live performance routine competition conditions emulating techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the various embodiments of the invention(s) and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the application is described in device-oriented terminology, each element of the device implicitly performs a function. Apparatus claims may not only be included for the device described, but also method or process claims may be included to address the functions of the embodiments and that each element performs. Neither the description nor the terminology is intended to limit the scope of the claims that will be included in any subsequent patent application.

It should also be understood that a variety of changes may be made without departing from the essence of the various embodiments of the invention(s). Such changes are also implicitly included in the description. They still fall within the scope of the various embodiments of the invention(s). A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the invention(s) both independently and as an overall system.

Further, each of the various elements of the embodiments of the invention(s) and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the invention(s), the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which embodiments of the invention(s) is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "processor" should be understood to encompass disclosure of the act of "processing"—whether explicitly discussed or not—and, conversely, were there effectively disclosure of the act of "processing", such a disclosure should be understood to encompass disclosure of a "processor" and even a "means for processing." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components that are configured to, or configured and arranged to, achieve a particular result, use, purpose, situation, function, or operation, or as components that are capable of achieving a particular result, use, purpose, situation, function, or operation. All should be understood as within the scope of this disclosure and written description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in any Information Disclosure Statement or other information statement filed with the application are hereby appended and hereby incorporated by reference, however, as to each of the above, to the extent that such information or statements incorporated by reference might be considered inconsistent with the patenting of the various embodiments of invention(s) such statements are expressly not to be considered as made by the applicant(s).

Thus, the applicant(s) should be understood to have support to claim and make claims to embodiments including at least: i) each of the emulation devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

In addition and as to computer aspects and each aspect amenable to programming or other electronic automation, it should be understood that in characterizing these and all other aspects of the various embodiments of the invention(s)—whether characterized as a device, a capability, an element, or otherwise, because all of these can be implemented via software, hardware, or even firmware structures as set up for a general purpose computer, a programmed chip or chipset, an ASIC, application specific controller, subroutine, or other known programmable or circuit specific structure—it should be understood that all such aspects are at least defined by structures including, as person of ordinary skill in the art would well recognize: hardware circuitry, firmware, programmed application specific components, and even a general purpose computer programmed to accomplish the identified aspect. For such items implemented by programmable features, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi) circuitry configurations (including configurations of transistors, gates, and the like) that act to sequence and/or cause actions as detailed, xxvii) computer readable medium(s) storing instructions to execute the steps and cause activities detailed, xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent inventions, and xxxiii) the various combinations of each of the above and of any aspect, all without limiting other aspects in addition.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the various embodiments of the application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The invention claimed is:

1. A live cheerleading competition conditions emulation apparatus comprising:
   a live cheerleading competition emulation networked environment;
   a first video camera capable of access to and being accessed through said networked environment and configured to record a first live cheerleading routine occurring at a first remote location;
   a first allocated memory capable of access to and being accessed through said networked environment and configured to automatically store said recorded first live cheerleading routine as first live cheerleading routine data;
   a first capture limit compliance data transformation processor configured to automatically create first capture limit compliant data for said first live cheerleading routine data;
   a second video camera capable of access to and being accessed through said networked environment and configured to record a second live cheerleading routine occurring at a second remote location;
   a second allocated memory capable of access to and being accessed through said networked environment and configured to automatically store said recorded second live cheerleading routine as second live cheerleading routine data;
   a second capture limit compliance data transformation processor configured to automatically create second capture limit compliant data for said second live cheerleading routine data;
   a normalization data transformation processor configured to automatically create normalized data for said capture limit compliant live cheerleading routine data;
   at least one judging terminal capable of access to and being accessed through said networked environment and configured to automatically display said normalized capture limit compliant live cheerleading routine data to a remote judge and to automatically accept judging input from said remote judge;
   a judging input validation data transformation processor configured to automatically create judgment validated data for said normalized capture limit compliant live cheerleading routine data;
   a third allocated memory capable of access to and being accessed through said networked environment and configured to automatically store said judgment validated normalized capture limit compliant live cheerleading routine data;
   a live cheerleading competition conditions emulated data aggregator capable of access to and being accessed through said networked environment and configured to automatically aggregate said judgment validated normalized capture limit compliant live cheerleading routine data into an emulated live cheerleading competition; and
   an emulated live cheerleading competition spectator portal capable of access to and being accessed through said networked environment and configured to automatically stage said emulated live cheerleading competition for remote spectator access.

2. A live cheerleading competition conditions emulation apparatus as described in claim 1 wherein said capture limit compliant data comprises capture limit compliant data selected from the group consisting of number of attempts capture limit compliant data, best attempt capture limit compliant data, first attempt capture limit compliant data, cheerleading routine required elements capture limit compliant data, cheerleading routine rules capture limit compliant data, and cheerleading routine time restrictions capture limit compliant data.

3. A live cheerleading competition conditions emulation apparatus as described in claim 1 wherein said capture limit compliant data comprises capture limit compliant data selected from the group consisting of perspective capture limit compliant data, multiple camera capture limit compliant data, soundtrack capture limit compliant data, background capture limit compliant data, aspect ratio capture limit compliant data, figure-to-ground capture limit compliant data, extraneous subject matter capture limit compliant data, and prejudicial subject matter capture limit compliant data.

4. A live cheerleading competition conditions emulation apparatus as described in claim 1 wherein said normalized data comprises normalized data selected from the group consisting of perspective compensation limit data, multiple camera compensation limit data, soundtrack compensation limit data, background compensation limit data, aspect ratio compensation limit data, figure-to-ground compensation limit data, extraneous subject matter scrubbing limit data, and prejudicial subject matter scrubbing limit data.

5. A live cheerleading competition conditions emulation apparatus as described in claim 1 wherein said judgment validated data comprises judgment validated data selected from the group consisting of judge qualifications compensation limit data, judge score weighting limit data, number of displayed views limit data, display pause limit data, display zoom limit data, display volume limit data, display playback speed limit data, display serial playback limit data, display parallel playback limit data, display order sequence playback limit data, and display time block playback limit data.

6. A live cheerleading competition conditions emulation apparatus as described in claim 1 wherein said live cheerleading competition conditions emulated data aggregator comprises an aggregator configured to automatically create an emulated live cheerleading competition selected from the group consisting of a fixed format aggregated emulated live cheerleading competition, a selectively formatted aggregated emulated live cheerleading competition, an unformatted aggregated emulated live cheerleading competition, an open access emulated live cheerleading competition, a restricted access emulated live cheerleading competition, a spectator participatory emulated live cheerleading competition, and a spectator non-participatory emulated live cheerleading competition.

7. A live cheerleading competition conditions emulation apparatus as described in claim 1 further comprising a fourth allocated memory capable of access to and being accessed through said networked environment and configured to automatically store said aggregated judgment validated normalized capture limit compliant live cheerleading routine data as digitally altered cheerleading competition video configured for playback through a video playback means, and wherein said emulated live cheerleading competition spectator portal comprises an emulated live cheerleading competition spectator portal configured to automatically play back said digitally altered cheerleading competition video.

8. A live performance routine competition conditions emulation apparatus comprising:
 a live performance routine competition emulation networked environment;
 a first recording means capable of access to and being accessed through said networked environment and configured to record a first live performance routine occurring at a first remote location;
 a first allocated memory capable of access to and being accessed through said networked environment and configured to automatically store said recorded first live performance routine as first live performance routine data;
 a second recording means capable of access to and being accessed through said networked environment and configured to record a second live performance routine occurring at a second remote location;
 a second allocated memory capable of access to and being accessed through said networked environment and configured to automatically store said recorded second live performance routine as second live performance routine data;
 at least one input/output means capable of access to and being accessed through said networked environment and configured to automatically output said live performance routine data to a remote judging location and to automatically accept competition judging input from said remote judging location;
 a third allocated memory capable of access to and being accessed through said networked environment and configured to automatically store said competition judging input as competition judging input data;
 a data transformation processor capable of access to and being accessed through said networked environment and configured to automatically transform any or any combination of said live performance routine data and said competition judging data into live performance routine competition conditions emulated data.

9. A live performance routine competition conditions emulation apparatus as described in claim 8 wherein said data transformation processor comprises a live performance routine data transformation processor configured to automatically create output limit data for said live performance routine data output through said input/output means.

10. A live performance routine competition conditions emulation apparatus as described in claim 9 wherein said output limit data comprises output limit data selected from the group consisting of number of views limit data, pause limit data, zoom limit data, volume limit data, playback speed limit data, serial playback limit data, parallel playback limit data, order sequence playback limit data, and time block playback limit data.

11. A live performance routine competition conditions emulation apparatus as described in claim 8 wherein said data transformation processor comprises a competition judging input data transformation processor configured to automatically create input limit data for said competition judging input data input through said input/output means.

12. A live performance routine competition conditions emulation apparatus as described in claim 11 wherein said input limit data comprises input limit data selected from the group consisting of judge qualifications compensation limit data and judge score weighting limit data.

13. A live performance routine competition conditions emulation apparatus as described in claim 8 wherein said data transformation processor comprises a live performance routine data transformation processor configured to automatically create normalization data for said live performance routine data.

14. A live performance routine competition conditions emulation apparatus as described in claim 13 wherein said normalization data comprises normalization data selected from the group consisting of perspective compensation limit data, multiple camera compensation limit data, soundtrack compensation limit data, background compensation limit data, aspect ratio compensation limit data, figure-to-ground compensation limit data, extraneous subject matter scrubbing limit data, and prejudicial subject matter scrubbing limit data.

15. A live performance routine competition conditions emulation apparatus as described in claim 8 wherein said data transformation processor comprises a live performance routine data transformation processor configured to automatically create capture limit compliance data for said live performance routine data.

16. A live performance routine competition conditions emulation apparatus as described in claim 15 wherein said capture limit compliance data comprises performance routine capture limit compliance data selected from the group consisting of number of attempts capture limit compliance data, best attempt capture limit compliance data, first attempt capture limit compliance data, performance routine required elements capture limit compliance data, performance routine rules capture limit compliance data, and performance routine time restrictions capture limit compliance data.

17. A live performance routine competition conditions emulation apparatus as described in claim 15 wherein said capture limit compliance data comprises technical capture limit compliance data selected from the group consisting of perspective capture limit compliance data, multiple camera capture limit compliance data, soundtrack capture limit compliance data, background capture limit compliance data, aspect ratio capture limit compliance data, figure-to-ground capture limit compliance data, extraneous subject matter capture limit compliance data, and prejudicial subject matter capture limit compliance data.

18. A live performance routine competition conditions emulation apparatus as described in claim 8 and further comprising:
 a live performance routine competition conditions emulated data aggregator capable of access to and being accessed through said networked environment and configured to automatically aggregate said live performance routine competition conditions emulated data into an emulated live performance routine competition; and
 an emulated live performance routine competition spectator portal capable of access to and being accessed through said networked environment and configured to automatically stage said emulated live performance routine competition for remote spectator access.

19. A live performance routine competition conditions emulation apparatus as described in claim 18 wherein said aggregator comprises an aggregator configured to automatically create an emulated live performance routine competition selected from the group consisting of a fixed format aggregated emulated live performance routine competition, a selectively formatted aggregated emulated live performance routine competition, an unformatted aggregated emulated live performance routine competition, an open access emulated live performance routine competition, a restricted access emulated live performance routine competition, a spectator participatory emulated live performance routine competition, and a spectator non-participatory emulated live performance routine competition.

20. A live performance routine competition conditions emulation apparatus as described in claim 8 further comprising a fourth allocated memory capable of access to and being accessed through said networked environment and configured to automatically store said live performance routine competition conditions emulated data as digitally altered video configured for playback through a video playback means.

\* \* \* \* \*